US011523267B2

(12) United States Patent
Sumien et al.

(10) Patent No.: US 11,523,267 B2
(45) Date of Patent: Dec. 6, 2022

(54) PROVIDING AIRCRAFT IN FLIGHT ROAMING FOR PASSENGER ELECTRONIC DEVICES TO HOME MOBILE NETWORK OPERATOR

(71) Applicant: Thales Avionics, Inc., Irvine, CA (US)

(72) Inventors: Maneesha Sumien, Mission Viejo, CA (US); Sam Martorella, Indialantic, FL (US); Mitchell Miers, Irvine, CA (US); Martin A. Matura, Melbourne, FL (US); Agnes Galzy, Melbourne, FL (US)

(73) Assignee: Thales Avionics, Inc., Irvine, CA (US)

( * ) Notice: Subject to any disclaimer, the term of this patent is extended or adjusted under 35 U.S.C. 154(b) by 14 days.

(21) Appl. No.: 17/214,981

(22) Filed: Mar. 29, 2021

(65) Prior Publication Data

US 2022/0312181 A1  Sep. 29, 2022

(51) Int. Cl.
*H04W 8/02* (2009.01)
*H04W 76/10* (2018.01)
(Continued)

(52) U.S. Cl.
CPC .............. *H04W 8/02* (2013.01); *H04M 15/60* (2013.01); *H04M 15/8351* (2013.01);
(Continued)

(58) Field of Classification Search
CPC . H04L 63/029; H04L 63/209; H04L 63/1466; H04L 25/08; H04M 15/80; H04W 4/80
(Continued)

(56) References Cited

U.S. PATENT DOCUMENTS

| 9,351,193 | B2 * | 5/2016 | Raleigh | ................. G06Q 40/12 |
| 10,225,236 | B2 * | 3/2019 | Haak | ....................... H04L 67/54 |

(Continued)

FOREIGN PATENT DOCUMENTS

| CN | 103229482 A | * | 7/2013 | ............. H04L 29/08 |
| EP | 3166278 A1 | * | 5/2017 | ......... H04B 7/18506 |

OTHER PUBLICATIONS

H. Batteram, G. Damm, A. Mukhopadhyay, L. Philippart, R. Odysseos and C. Urrutia-Valdés, "Delivering quality of experience in multimedia networks," in Bell Labs Technical Journal, vol. 15, No. 1, pp. 175-193, Jun. 2010, doi: 10.1002/bltj.20431. (Year: 2010).*

(Continued)

*Primary Examiner* — William D Cumming
(74) *Attorney, Agent, or Firm* — Sage Patent Group

(57) ABSTRACT

An aircraft cabin communication system includes a wireless access point (WAP) and a connectivity server. The WAP transmits a beacon indicating Hotspot capability and identifying an open SSID, establishes a connection with a first passenger electronic device (PED) carried onboard an aircraft responsive to communications received from the first PED using the open SSID, and provides a list of mobile network operators (MNOs) to the first PED. The connectivity server receive a request to setup a PDU session through the Internet for the first PED. The request identifies a mobile network operator (MNO) associated with the first PED. The connectivity server initiates authentication using extensible authentication protocol (EAP) communications with the first PED and an authorization, authentication, and accounting (AAA) server associated with a partner MNO connected with the MNO identified by the first PED. Responsive to the AAA server granting access to the first PED, the connectivity server triggers the WAP to redirect communications with the first WAP to a hidden SSID, sets up the PDU session for the first PED using the hidden SSID, and performs
(Continued)

network resource usage measurements for traffic in the PDU session for the first PED.

20 Claims, 17 Drawing Sheets

(51) Int. Cl.
    *H04M 15/00*     (2006.01)
    *H04W 24/08*     (2009.01)
    *H04W 48/10*     (2009.01)
(52) U.S. Cl.
    CPC ........... *H04W 24/08* (2013.01); *H04W 48/10* (2013.01); *H04W 76/10* (2018.02)
(58) Field of Classification Search
    USPC ........................................................ 370/235
    See application file for complete search history.

(56) References Cited

U.S. PATENT DOCUMENTS

| | | | | |
|---|---|---|---|---|
| 10,291,710 | B2* | 5/2019 | Sabbaghian | H04L 67/12 |
| 10,313,304 | B2* | 6/2019 | Haak | H04L 63/0209 |
| 10,523,634 | B2* | 12/2019 | Haak | G06F 21/30 |
| 2004/0176074 | A1 | 9/2004 | Radpour | |
| 2009/0024272 | A1* | 1/2009 | Rogers | H04W 4/80 |
| | | | | 709/208 |
| 2014/0098671 | A1* | 4/2014 | Raleigh | H04M 15/8257 |
| | | | | 370/235 |
| 2014/0280491 | A1* | 9/2014 | Heron | G06Q 20/123 |
| | | | | 709/203 |
| 2015/0349875 | A1 | 12/2015 | Lauer et al. | |
| 2017/0093788 | A1 | 3/2017 | Bantoft et al. | |
| 2017/0126622 | A1* | 5/2017 | Haak | H04L 63/0209 |
| 2017/0126625 | A1* | 5/2017 | Haak | H04L 63/029 |
| 2018/0019803 | A1 | 1/2018 | Lauer et al. | |
| 2018/0049005 | A1 | 2/2018 | Still | |
| 2018/0069929 | A1* | 3/2018 | Sabbaghian | H04L 67/12 |
| 2019/0149517 | A1* | 5/2019 | Haak | H04L 63/029 |
| | | | | 726/11 |
| 2020/0076849 | A1* | 3/2020 | Watson | H04L 63/1466 |

OTHER PUBLICATIONS

A. K. Salkintzis, C. Fors and R. Pazhyannur, "WLAN-GPRS integration for next-generation mobile data networks," in IEEE Wireless Communications, vol. 9, No. 5, pp. 112-124, Oct. 2002, doi: 10.1109/MWC.2002.1043861. (Year: 2002).*
International Search Report and Written Opinion of the International Searching Authority for PCT Application No. PCT/US22/22366 dated Jul. 27, 2022.

* cited by examiner

PROVIDING AIRCRAFT IN FLIGHT ROAMING FOR PASSENGER ELECTRONIC DEVICES TO HOME MOBILE NETWORK OPERATOR

TECHNICAL FIELD

The present disclosure relates to aircraft cabin communications networks and, more particularly, to providing aircraft cabin in flight roaming services through satellite networks for passenger electronic devices.

BACKGROUND

Ground-based mobile communication systems have evolved to where users expect to always have communications capabilities for text messages, phone calls, and data connectivity through the Internet. Users expect to roam seamlessly with full communications capabilities between coverage areas of mobile network operators (MNOs) both domestically and abroad. Aircraft cabin communications systems have not supported seamless roaming.

For aircraft cabin communication systems, phone call service has primarily been provided by onboard mobile telephony service (OMTS) with dedicated onboard telephony equipment (e.g., mounted to passenger seatbacks) or using passenger electronic devices (PEDs) which are sometimes provided limited services for voice calls and Short Message Service (SMS) via a satellite communications link. Other PED functions have been blocked unless an Internet data is plan purchased onboard the aircraft and which is provided by an operator associated with the airline. An Internet data plan enables a PED to use phone applications (e.g., Skype™) which operate to communicate Over The Top™ (OTT), social media and messaging services (e.g., WhatsApp™), and other Internet functions (e.g., voice and/or video streaming, Internet browsing, etc.) via the satellite communications link provided by the operator associated with the airline.

While airlines providing OMTS equipment have an advantage of being preconfigurable to enable relatively seamless passenger use, the equipment adds cost and weight to aircraft. Although passengers can have the option to use their PEDs for connectivity, they are blocked from Internet data services until they purchase an onboard data plan which involves passenger initiated action and cost acceptance under an airline specified data plan(s), and undermines the passengers' desire to obtain seamless roaming anywhere among ground-based mobile communication systems and between ground-based and aircraft-based communications systems.

SUMMARY

As will be explained in further detail below, some embodiments of the present disclosure are directed to providing an aircraft cabin communication system that communicates with a ground-based communication system to support communications of passenger passenger electronic devices (PEDs) onboard an aircraft. Some of these and other embodiments are directed to system operations that enable passengers to operate PEDs to send and receive text messages and phone calls through an operator associated with the aircraft, but which separately queries passengers to authorize making charges for protocol data unit (PDU) sessions through the Internet to the operator associated with the aircraft or to mobile network operators (MNOs) respectively associated with the PEDs.

In one embodiment, a vehicle cabin communication system includes a wireless access point (WAP) and a connectivity server. The WAP is configured to transmit a beacon indicating Hotspot capability and identifying an open service set identifier (SSID), establish a connection with a first passenger electronic device (PED) carried onboard a vehicle responsive to communications received from the first PED using the open SSID, and provide a list of mobile network operators (MNOs) to the first PED. The connectivity server is configured to receive a request to setup a protocol data unit (PDU) session through the Internet for the first PED, wherein the request identifies a MNO associated with the first PED and identifies an international mobile subscriber identity (IMSI) of the first PED. The connectivity server is further configured to respond to the request to setup the PDU session for the first PED, by initiating authentication of the first PED using extensible authentication protocol (EAP) communications with the first PED and an authorization, authentication, and accounting (AAA) server associated with a partner MNO connected with the MNO identified by the first PED. The connectivity server is further configured to respond to the AAA server granting access to the first PED, by triggering the WAP to redirect communications with the first WAP to a hidden SSID, setting-up the PDU session for the first PED using the hidden SSID, and performing network resource usage measurements for traffic in the PDU session for the first PED.

In a further embodiment, the connectivity server is further configured to respond to receipt of the request to setup the PDU session for the first PED, by sending a first query through the WAP to the first PED requesting a passenger operating the first PED to authorize making charges for the PDU session to an operator associated with the vehicle or to the MNO identified by the first PED. The connectivity server responds to a reply from the first PED authorizing making charges for the PDU session to the MNO identified by the first PED, by initiating the authentication of the first PED using the EAP communications with the partner MNO connected with the MNO identified by the first PED.

In another further embodiment, the connectivity server is further configured to respond to receipt of another request to send a text message for the first PED or to setup a voice call for the first PED, by sending the text message or setting up the voice call without sending a query through the WAP to the first PED which requests the passenger operating the first PED to authorize making charges for the text message to the voice call to the operator associated with the vehicle or to the MNO identified by the first PED.

Some other related embodiments are directed to a ground-based communication system to support communications of PEDs onboard passenger vehicles. The ground-based system includes an interconnection point configured to receive from a vehicle cabin communication system, a request to setup a PDU session through the Internet for a first PED carried onboard a vehicle, wherein the request identifies a MNO associated with the first PED, to authenticate the first PED using EAP communications with the PED and an AAA server associated with a partner MNO connected with the MNO identified by the first PED. The interconnection point is further configured to respond to the AAA server granting access to the first PED, by setting up the PDU session for the first PED and performing network resource usage measurements for traffic in the PDU session for the first PED.

In a further embodiment the interconnection point is further configured to respond to receipt of the request to setup the PDU session through the Internet for the first PED, by sending a first query to the first PED requesting a passenger operating the first PED to authorize making charges for the PDU session to an operator associated with the vehicle or to the MNO identified by the first PED. The interconnection point is further configured to respond to a reply from the first PED authorizing making charges for the PDU session to the MNO identified by the first PED, by initiating the authentication of the first PED using the EAP communications with the partner MNO connected with the MNO identified by the first PED.

Potential advantages that may be provided by one or more of these embodiments is that they enable passengers to be provided Internet access to PEDs through roaming services provided through the operations of the vehicle cabin communication system and the ground-based communication system. A passenger can authorize charges for the Internet access to be made to an operator associated with the vehicle or to an MNO that is already associated with the PED. In this manner, a passenger may seamlessly roam onto an aircraft in use a PED during flight with charges being performed through the existing charging agreements of the passengers PED MNO, such as Verizon™, AT&T™ or another mobile network operator.

It is noted that aspects described with respect to one embodiment may be incorporated in different embodiments although not specifically described relative thereto. That is, all embodiments and/or features of any embodiments can be combined in any way and/or combination. Moreover, other systems, methods, and computer program products according to embodiments will be or become apparent to one with skill in the art upon review of the following drawings and detailed description. It is intended that all such other systems, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
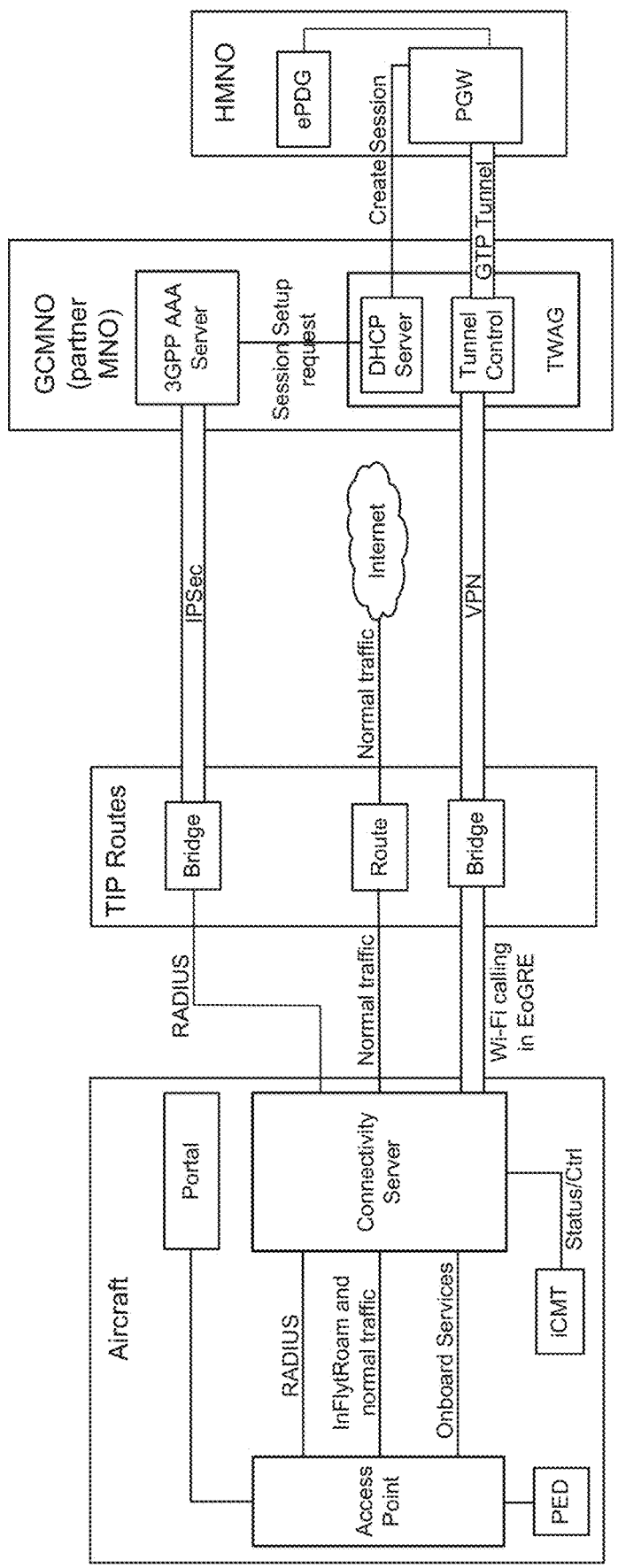
FIG. 1 illustrates an aircraft cabin communication system that communicates with a ground-based communication system to provide roaming for PEDs carried onboard an aircraft in accordance with some embodiment.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

1. Overview of Various Embodiments

Various embodiments of the present disclosure are directed to operations by which communications services are provided to passenger electronic devices (PEDs) which are carried within an aircraft cabin during flight, and where the communications services support the native dialer within the PEDs for roaming service while inflight using an onboard cabin Wi-Fi network. A PED can be any type of electronic device (e.g., smartphone, tablet, laptop) used by a passenger to connect to the in-cabin network. These operations leverage the existing Wireless Local Area Network (WLAN) service, the satellite networks, and an interface to the Public Land Mobile Network (PLMN) to extend network services to the mobile devices in the aircraft. The operations may not use the normal 3G, 4G (LTE) or 5G provided Radio Access Network (RAN). In accordance with some embodiments, a Passpoint Certified PED operates to automatically connect to the Hotspot 2.0 wireless network by utilizing the built-in Wi-Fi connection manager and Passpoint Certified Wireless Access Points (WAPs). Authentication may be performed as defined by 802.11u and Remote Authentication Dial In User Service (RADIUS), via Extensible Authentication Protocol over LAN (EAPoL) and Authentication messages.

Some embodiments are configured to be built upon (modification to) services provided by, for example, ZephyrTel™ and Deutsche Telekom AG™. ZephyrTel™ provides services that support diverse authentication, security, and identity management protocols. The ZephyrTel™ further provides services that support authentication with Wi-Fi roaming providers. Deutsche Telekom AG™ provides services that support Wi-Fi roaming relationships. Services for roaming between Wi-Fi WAPs can be provided by other Global Carrier Mobile Network Operators (GCMNOs). The GCMNO is a type of partner MNO that has existing billing relationships with many mobile network operators (e.g., Verizon™, AT&T™, T-Mobile™, etc.) and can operate as a clearinghouse for charging for PED utilization of airline communication resources to the mobile network operator registered with a PED. These modified services provide security, data, mobile and voice services with home routed Wi-Fi data roaming, including seamless SIM-based access, home routed data and standard clearing and settlement.

FIG. 1 illustrates an aircraft cabin communication system that communicates with a ground-based communication system to provide roaming for PEDs carried onboard an aircraft in accordance with some embodiment. The illustrated system can provide roaming that is SATCOM agnostic, where the GCMNO integration may operate on top of features provided by Orange International Carriers. The aircraft crew can be provided the capability to disable/enable the PED roaming service onboard via an Interactive Cabin Management Terminal (iCMT). When a PED is Passpoint Certified and associated (e.g., registered) with one of a set of supported carriers, the PED connects to the Hotspot 2.0 Wi-Fi network to can be automatically provided inflight roaming services with charges being made to the associated carrier.

An Authorization, Authentication, and Accounting (AAA) server can operate as the aggregator for authentication. After successful authentication through the AAA server, the GCMNO routes all relevant data to the home network for consumption by the home network, or for egress to the Internet. Note for the PEDs that don't support Hotspot 2.0 or which are associated with other carriers which do not have roaming agreement for the airline network, the inflight roaming service will be denied to the PEDs. The roaming denied PEDs may still be capable of using a captive portal for service, if provided by the aircraft network.

2. Operational Concepts

Figure 2A:
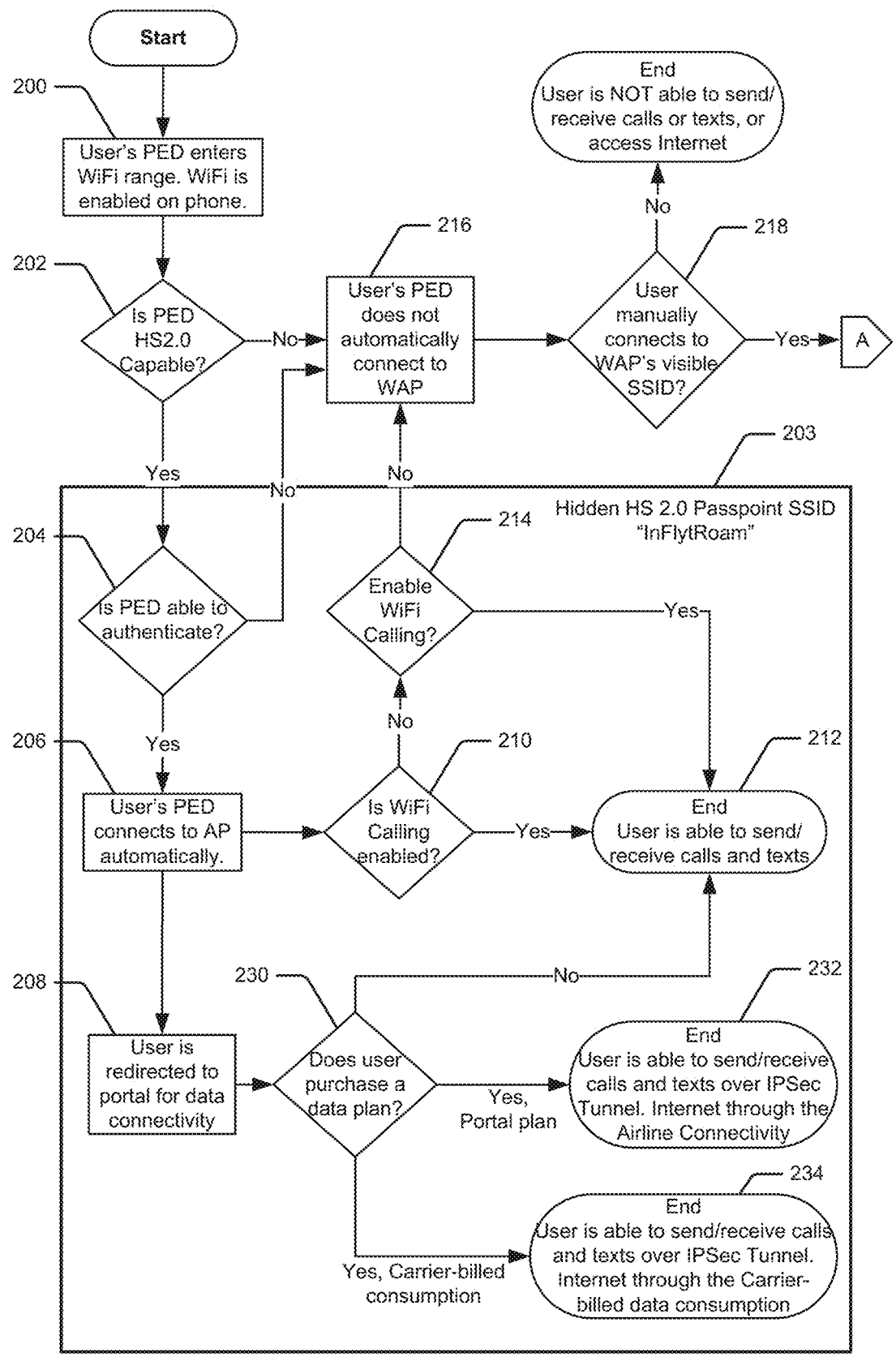
FIGS. 2A and 2B illustrate a flowchart of operations that can be performed by components of the aircraft cabin communication system (cabin network) in accordance with some use case embodiments.
Figure 2B:
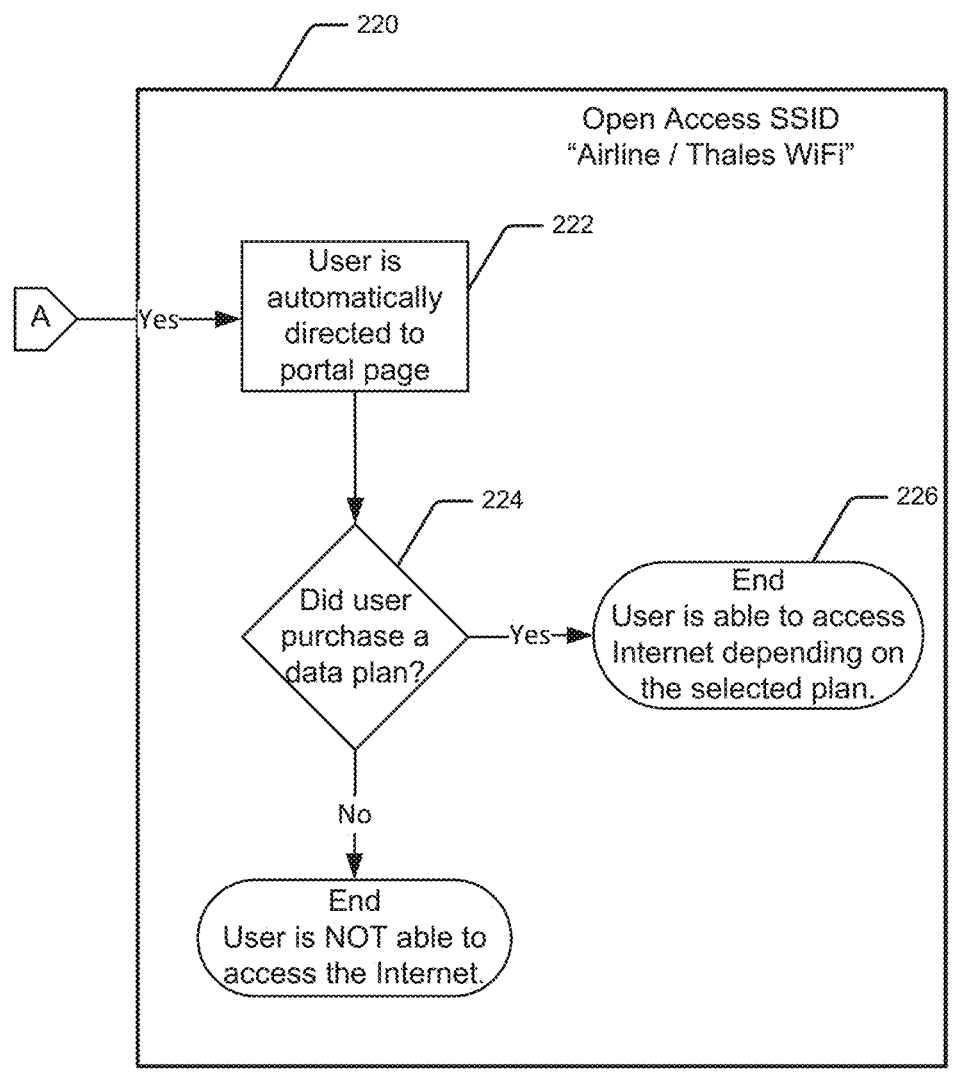

FIGS. 2A and 2B illustrate a flowchart of operations that can be performed by components of the aircraft cabin communication system (cabin network) in accordance with some use case embodiments.

Referring to FIGS. 2A and 2B, the user's PED enters 200 a Wi-Fi access point (WAP), which is illustrated as an "AP", coverage area in the aircraft. The WAP determines 202 whether the in-flight roam (also called InFlytRoam) service is enabled and the user's PED supports Hotspot 2.0. If so, the WAP attempts to authenticate 204 the PED when it joins 203 the network such as using a hidden SSID (e.g., hidden hotspot 2.0 passport SSID).

If the PED has a supported carrier Wi-Fi calling plan, the PED can be automatically authenticated 204 onto the WAP and the PED automatically connects 206 to the WAP using a hidden SSID (e.g., hidden hotspot 2.0 passport SSID). If WiFi calling is determined 210 to be enabled, the cabin network can operate to provide services 212 to the PED to allow the user to send and/or receive calls and texts using the PED. If WiFi calling is determined 210 to not be enabled, the cabin network can determine 214 whether to enable the WiFi calling and, if so, then can operate to service 212 the user sending and/or receiving calls and texts using the PED. Moreover, upon successful seamless authentication, the WAP and PED can receive a notification from the carrier informing of now being in roaming condition. At this point, native voice and SMS functionality is permitted. The user is billed for these services by the cellular service provider (mobile network operator (MNO)) associated with the PED.

Moreover, when PED connects 206 to the WAP using the hidden SSID (e.g., hidden hotspot 2.0 passport SSID), the PED is redirected 208 to a portal for data connectivity. The portal can display on the PED multiple user plans for data connectivity while inflight and query the user to purchase (authorize) one of the displayed plans. For example, one of the display plans can be to: 1) obtain data connectivity with billing serviced through an operator associated with the airline (e.g., pay a fixed price or tiered price for access during flight); and 2) obtain data connectivity with billing serviced through the cellular service provider (mobile network operator (MNO)) associated with the PED (e.g., provided access with pricing according to existing roaming agreement with MNO). When the user is determined 230 to have purchased a data connectivity plan with billing by the operator associated with the airline, the cabin network operates 232 to provide data connectivity service to the PED, which can include sending and receiving calls and texts over IPSec tunnel, and Internet access through the aircraft Internet connectivity (e.g., SATCOM link). In contrast, when the user is determined 230 to have purchase of a data connectivity plan with billing through the cellular service provider (MNO) associated with the PED, the cabin network can operate 234 to provide service to the PED for sending and receiving calls and texts over IPSec tunnel, and Internet access through the aircraft Internet connectivity (e.g., SATCOM link) with charging to the cellular service provider (MNO).

In contrast, if the cabin network determines 216 that the PED does not automatically connect (e.g., WAP determines 202 InFlytRoam service is not enabled and/or the PED does not support Hotspot 2.0), the user can operate 220 the PED to manually connect 218 to the cabin network via an open SSID of the WAP to obtain internet service. For example, the operations 220 can include automatically directing 222 the user to a portal page where the user can be given the option to purchase a data plan. When the user is determined 224 to have purchased the data plan the PED is provided 226 data services and may be able to access the Internet depending upon the selected data plan.

3. Architecture Overview

Figure 3:
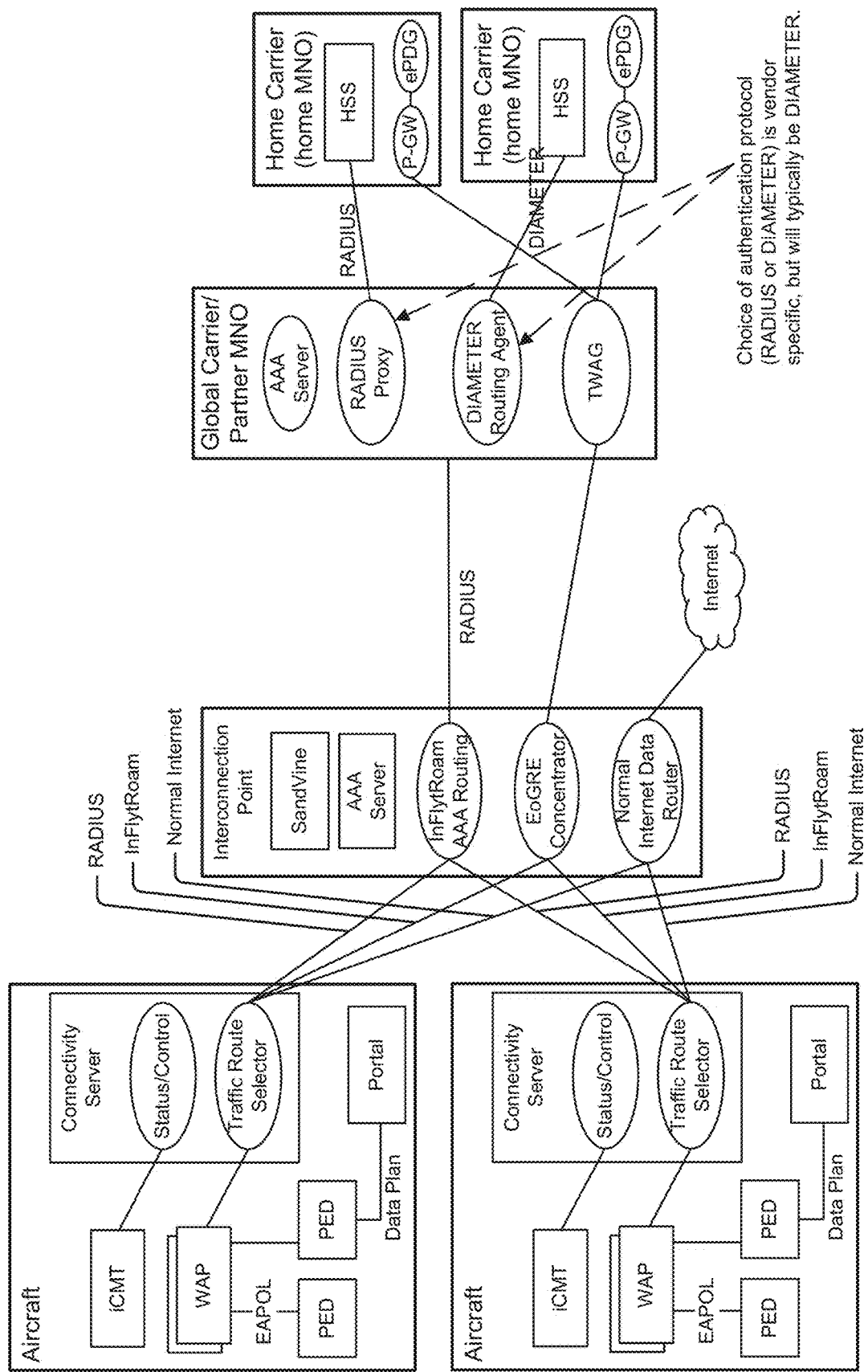
FIG. 3 illustrates a block diagram of components of the aircraft cabin communication system and the ground-based communication system providing inflight roaming to PEDs in accordance with some embodiments.

FIG. 3 illustrates a block diagram of components of two aircraft cabin communication systems and a ground-based communication system providing inflight roaming to PEDs in accordance with some embodiments.

Referring to FIG. 3, the aircraft cabin communication system (also called cabin network) includes a WAP and a connectivity server. The WAP advertises available carriers in one of several ways including: as a Public Land Mobile Network (PLMN) list; a network access identifier (NAI) realm specifically for in-flight roaming service; a list of roaming consortium organization identifiers (OIs). The PED uses onboard data to select a WAP for voice over WiFi (VoWiFi) service. The cabin network in cooperative operation with the home carrier (home MNO) authenticates and/or authorizes service and generates charging information accounting for use of the service.

The illustrated components of the ground-based communication system include, an interconnection point, an AAA server (which may be part of a GCMNO), a carrier partner (which may provide the AAA server), and a home network. The interconnection point communicates with the connectivity server via an IP backhaul through, e.g., a satellite network (e.g., SATCOM). The home carriers (home MNOs) can include an evolved packet data gateway (ePDG), a home subscriber server (HSS), a packet data network (PDN) gateway, and a serving gateway. The AAA server can communicate with the home carrier (home MNO) which is associated (registered) with the PED to perform authentication, authorization, accounting signalling through the carrier partner using, e.g., RADIUS or DIAMETER identity request, PED subscriber identification module (SIM) challenge, and accounting reporting and recording.

The Global Carrier Mobile Network Operator (GCMNO) may be based on a service provided by, for example, Deutsche Telekom AG™.

Some of the illustrated features include that aircraft crew are provided the capability to enable and disable the in-flight roam service via the iCMT. Seamlessly authentication is provided for Passpoint Certified PEDs by utilizing the Passpoint and hotspot 2.0 technology, with the authentication message provided through the AAA aggregator which may be part of a service by ZephyrTel™. Native call and text service can be provided to the PED after successful authentication on the Hotspot 2.0 network.

A routing selection function is provided on board the aircraft, such as with the connectivity server distinguishing between talk/text and normal Internet traffic, and responsively routing talk/text differently than Internet traffic. In some embodiments, all normal Internet traffic from the PED connected with the Hotspot 2.0 SSID is routed to the portal for the passenger to choose the internet plan. All native talk and text traffic are routed over the EoGRE tunnel to the interconnect point (IP) which is then forwarded onto the GCMNO and home carrier. All normal Internet traffic from the PED connecting with the open SSID are direct routed.

Traffic prioritization operations can be provided. PED traffic can be prioritized over the SATCOM network to ensure the quality of calls is maintained, with the corresponding DSCP is tagged by the Connectivity Server and user managed services (UMS). The UMS is a collection of services that together shape an Internet user's session experience during flight.

The SATCOM can be agnostic to the in-flight roaming service.

4. Network Design

On-board aircraft, the PED that connects to the Passpoint Certified SSID (e.g., hidden SSID) is assigned with a different VLAN from the ones that access the other SSIDs (e.g., non-hidden SSID).

Figure 4:
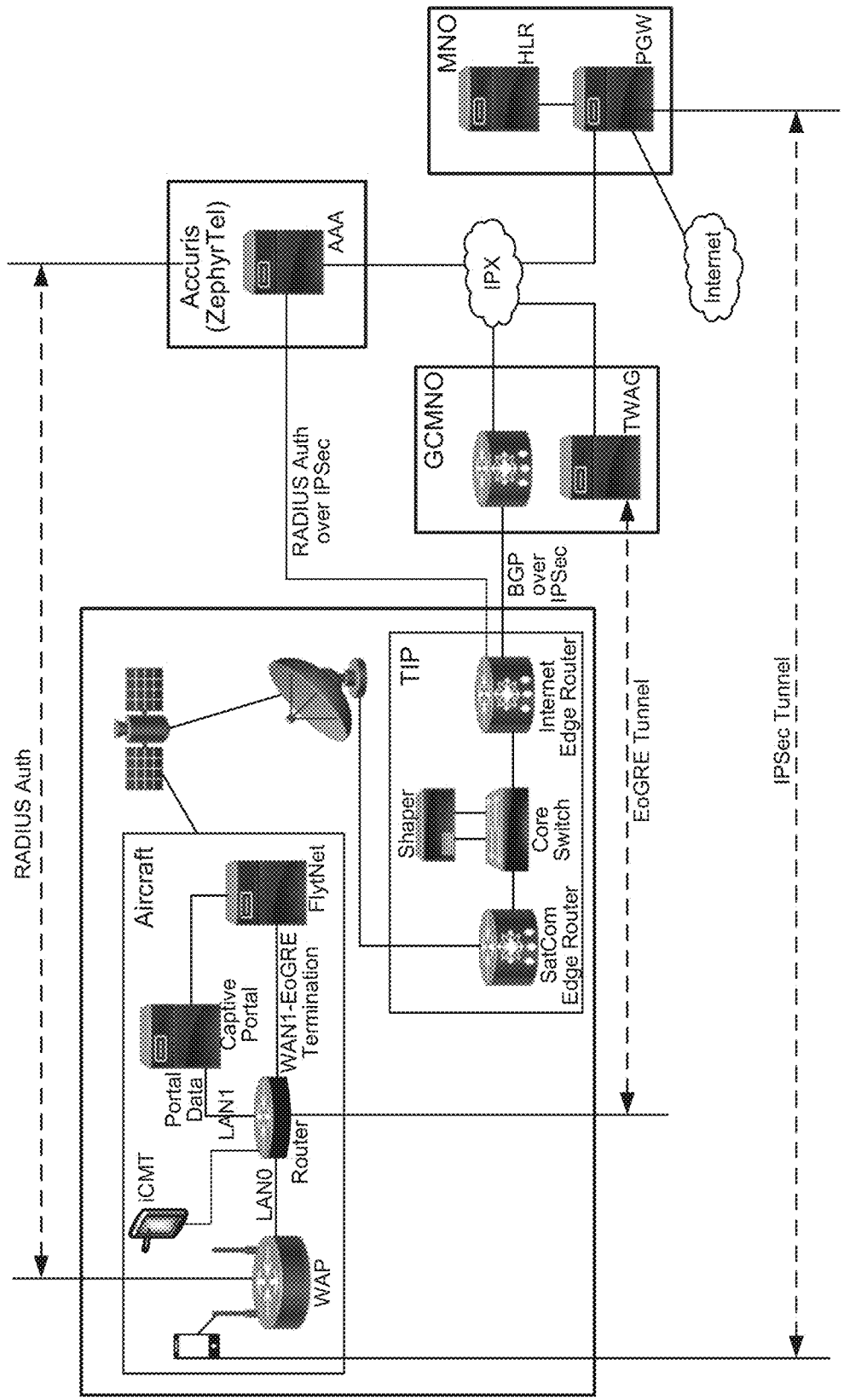
FIG. 4 illustrates a further block diagram of components of the aircraft cabin communication system and the ground-based communication system providing a detail view of the network design including the access stratum and the transport stratum.

FIG. 4 illustrates a further block diagram of components of the aircraft cabin communication system and the ground-based communication system providing a detail view of the network design including the access stratum and the transport stratum. The access stratum uses operations by which the PED detects, selects, associates, and authenticates itself with the Wi-Fi network. The AAA traffic takes the path through an IPSec tunnel established between the TIP and AAA server to convey the RADIUS AAA traffic for end user authentication.

The transport/service/application strata uses operations by which the PED establishes communication with the serving network. These operations include establishing a secure communication path with the home network as well as registration and any service usage. The user call and messaging traffic would take the path. The secure connection includes: an EoGRE tunnel is established between the aircraft to the Trusted Wireless Access Gateway (TWAG) for in-flight roam (also called InFlytRoam) traffic; a redundant IPSec tunnel is established between TIP and GCMNO; and an IPSec tunnel is established automatically between the PED and the MNO.

The TWAG operates to permit or deny access to user data, provides DHCP functions, terminates Ethernet over GRE tunnel (EoGRE, or L2GRE), and provides GTP tunnel to packet gateway (PGW). The MNO can include the home location register which includes: SIM card data; MSISDN (e.g., PED phone numbers); subscriber services; GPRS settings; and current subscriber location. The packet data network gateway (PGW) operates to provide: access into and out of the mobile network operator (MNO); policy enforcement; filtering; perform charging based on network resource usage measurements for traffic in PDU sessions for the PED; and may further provide lawful intercept.

The bridge/router/filter function which implements the L2 route selection can include the following. All subscribers can have their VoWiFi IPsec traffic routed to their corresponding TWAG/GTP tunnel. This traffic can be identified by destination IP/UDP port for their home ePDG. This can require selecting an L2 destination (EoGRE tunnel) based on L3/L4 information. The traffic is identified via UDP port 500 and 4500. If the airline is providing carrier billed generic data, then all data should be routed to the TWAG/GTP tunnel. In this case, a simple bridging function is sufficient. If the airline is not providing carrier billed generic data, then all non-talk and text traffic should be intercepted. DNS requests not satisfied by on-board facilities should redirect the user to the captive portal. Until such time as the user purchases a data plan, all non-VoWiFi traffic should be discarded.

In terms of the flow, once the authentication successes, the user acquires an IP address via DHCP over an EoGRE tunnel interface. The DHCP request should look like it is coming directly from the user device and not from a DHCP proxy or relay. The DHCP server is through the TWAG provided by the carrier partner. This gateway creates a GPRS Tunnel Protocol (GTP) tunnel on behalf of the user to the carrier. This tunnel allows routing of data to the user's home carrier and allows the user's PED traffic to egress to the Internet as if it originated on the home carrier's network. Connectivity server bridges the VLAN for SSID and the Tunnel for GRPS in order to establish communication with TWAG so that it can be seen as on a same LAN. Note that ModMan sees GRE tunnel traffic for Voice & Text traffic. An IPsec tunnel is then established between the PED and the home carrier's Packet Data Network Gateway (PGW). That is, Wi-Fi Calling traffic between the PED and the home carrier flows over a tunnel within a tunnel. Raw IP traffic is exchanged between the users and the home network via a GTP tunnel anchored by the carrier partner. Note that the in-air portals for the user data does not flow in the tunnel between the PED and the cellular provider.

Figure 5:
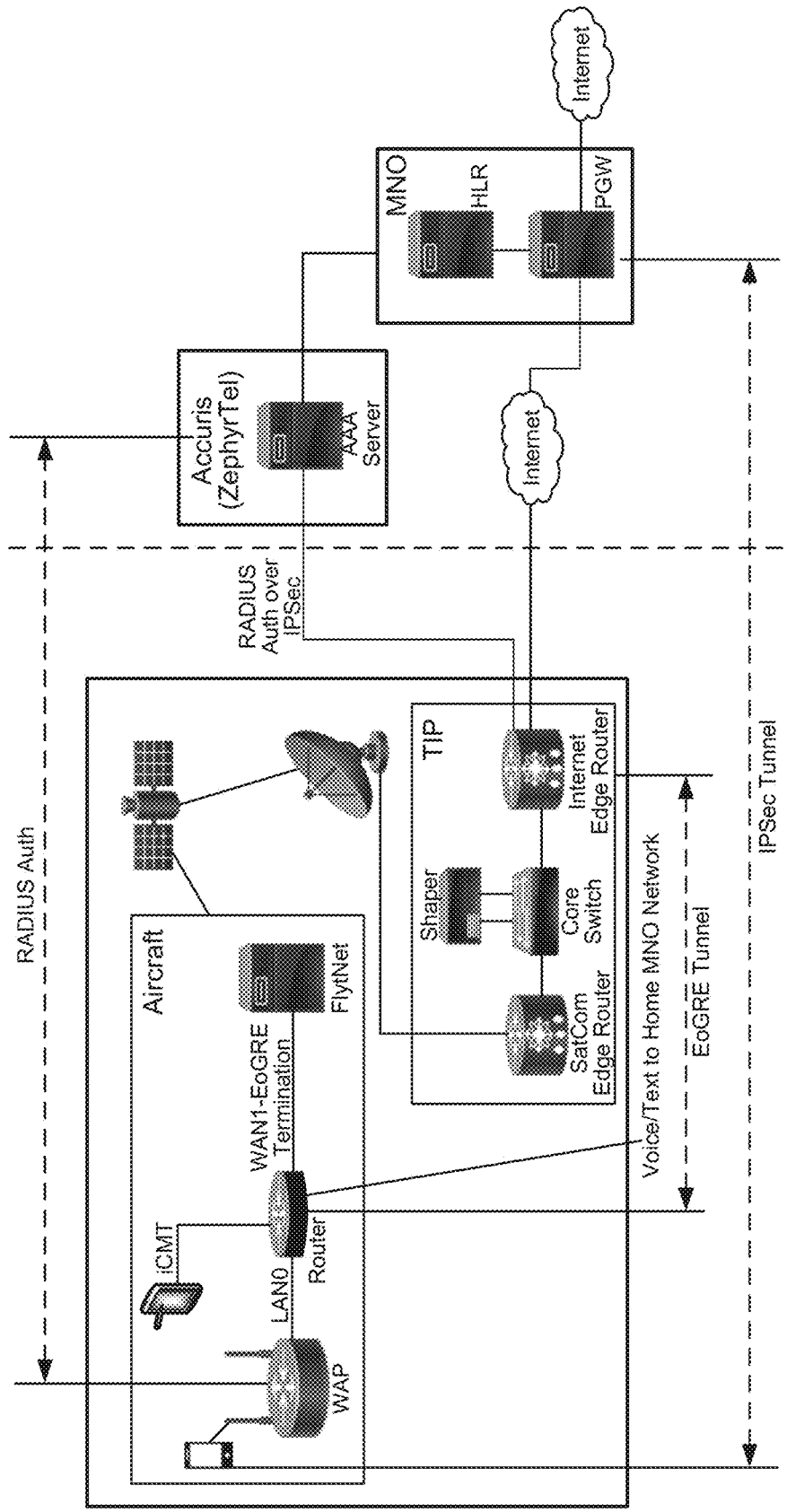
FIG. 5 illustrates a block diagram of components of the aircraft cabin communication system and the ground-based communication system where the GCMNO is not in the loop in accordance with some embodiments.

FIG. 5 illustrates a block diagram of components of the aircraft cabin communication system and the ground-based communication system where the GCMNO is not in the loop. In some embodiments, a partial implementation can include where the GCMNO is not in the loop and the intermediate architecture diagram is shown in FIG. 5. The EoGRE tunnel is terminated in TIP instead of TWAG. Additionally, the normal internet traffic initiated by the PED that is provided with the InFlytRoam service is blocked. The AAA message is directly sent to from Aggregator to Home Carrier and the EoGRE tunnel ends in TIP.

As explained regarding FIG. 4, the MNO can include the home location register which includes: SIM card data; MSISDN (e.g., PED phone numbers); subscriber services; GPRS settings; and current subscriber location. The packet data network gateway (PGW) operates to provide: access into and out of the mobile network operator (MNO); policy enforcement; filtering; perform charging based on network resource usage measurements for traffic in PDU sessions for the PED; and may further provide lawful intercept.

4. System Functions for Text or Calling On-Board the Aircraft without Need for a Passenger to Login Various system embodiments uses WAPs that support the 802.11u standard utilizing Passpoint and Hotspot 2.0 technology to provide passengers with native text and calling capabilities. The system supports a Passpoint Certified PED which has a supported carrier Wi-Fi calling plan and WiFi Calling feature enabled for the MNO associated with the PED. RADIUS Authentication configuration is available and carrier setting support is provided on the Passpoint Certified WAP.

Operations that support of in-flight roaming for PEDs includes: Passpoint on some PEDs and WAPs, which allows the PED to analyse the Wi-Fi WAPs available to it for possible access. The operations rank the WAPs by desirability. If the WAP configuration allows it, the PED will automatically attempt to join the network provided by the WAP. Passpoint enables cellular-like roaming among Wi-Fi networks. Hotspot-2.0 technology is the technical specification for implementing a network that supports Passpoint Certified Devices. A Hotspot 2.0 network supports Passpoint Certified devices for network discovery, registration, provisioning and access. Hotspot 2.0 network allows automatic connection to known services based on detailed backend information.

Operations provide RADIUS Authentication which is part of the network joining procedure. HotSpot-2.0 should not work without authentication—the network should not be open access. The operation of authentication for a PED is to query the PED and the home service provider for the PED and compare the responses (a "SIM challenge"). To avoid an AAA feed to every home service provider, a single service provider may be used to support the AAA.

Operations provide Wi-Fi calling technology supported by some PEDs where the PEDs can create an IP session with their home network (associated MNO) for the purpose of call delivery and texting (the "telephony" services). Wi-Fi calling is enabled by operations on the PED, including user action or carrier action, depending on the PED and carrier. Phones that do not implement Wi-Fi calling, and that do not have it turned on, cannot make/take calls or send/receive texts.

5. Hotspot 2.0 Operations

The captive portal SSID has encryption enabled in order to allow open access to the captive portal without authentication token. The open SSID can be necessary to allow any pre-HS2.0 PED to connect, and then redirect the PED on access to the captive portal, where Wi-Fi Calling uses a second, hidden SSID at the WAP. The operations use the Hotspot (HS) 2.0 defined authentication. The HS2.0 SSID has encryption enabled in order to perform the authentication. Using a hidden SSID does not prevent a PED from trying to connect to it, and even if they guess the SSID, it will not pass the authentication unless it is a valid, supported device and user. The following items should be provisioned on the WAPs:

1) A hidden SSID
   a. EAP authentication enabled (this means that it cannot be the same SSID as that of the captive portal)
   b. WPA2-CCMP encryption
2) A AAA policy—the address of the RADIUS proxy must be set
   a. specify the IP address of the RADIUS proxy
   b. RADIUS accounting will be necessary for informing the aggregator of data usage
3) A passpoint policy
   a. a roaming consortium object id, or the MCC/MNC of all supported carriers, or an NAI realm, or some combination
   b. one or more domains
   c. Internet enabled
   d. IPv4 and IPv6 address type
   e. WAN metrics
   f. Connection capabilities
   g. Access network type
   h. Venue type
   i. Venue name
   j. Operator name
   k. OSU information With this information, as well as matching information in the PED's PPS-MO, the PED will automatically connect to the access point following the procedure defined in 802.11u, such as according to the data flow illustrated in FIG. 6 for the access procedure between a PED and a WAP (illustrated as "AP") in accordance with some embodiments.

Figure 6:
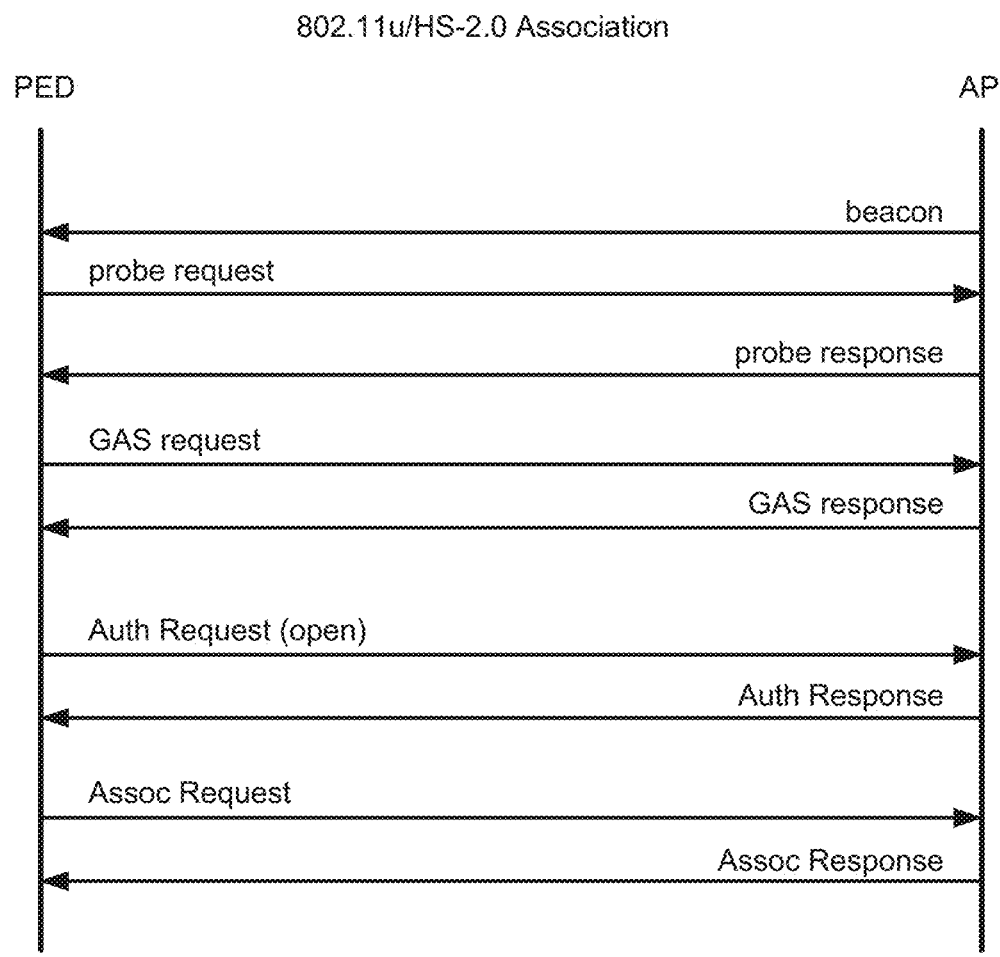
FIG. 6 illustrates a flowchart of operations data flow for an access procedure between a PED and a WAP (illustrated as "AP") in accordance with some embodiments.

Referring to FIG. 6, the WAP uses a beacon to advertise HS-2.0 capability. The beacon and/or the probe response will return the roaming consortium object identifier, the MCC/MNC list, and the NAI realms available. The WAP is open to WEP/802.11b authentication (WPA2-Enterprise/802.1x is used instead). Association will be allowed in order to perform 802.1x authentication. A properly configured PED will automatically join this Wi-Fi network, at which point 802.1x authentication can start.

6. RADIUS Authentication

Authentication is the process by which the credentials and cryptographic challenge data for a PED will be established. The PED's identity will be discovered, and the home carrier determined, by the authentication challenge executed when the PED attaches to the WAP. Authentication proceeds as defined by 802.11u and RADIUS, via Extensible Authentication Protocol over LAN (EAPoL) and Authentication messages.

Initialization operations include, on detection of a new PED, the port on the WAP is enabled and set to the "unauthorized" state. In this state, only 802.1X traffic is allowed; other traffic is dropped. To initiate authentication the WAP will periodically transmit EAP-Request Identity frames to a special Layer 2 address on the local network segment. The PED listens on this address, and on receipt of the EAP-Request Identity frame it responds with an EAP-Response Identity frame containing an identifier for the PED such as a User ID. The WAP then encapsulates this Identity response in a RADIUS Access-Request packet and forwards it on to the AAA proxy server as defined by the AAA policy. The message is then sent to GCMNO, while GCMNO presents the "in-flight service realm" to other network operators by extending their existing roaming agreements with partners to cover the new service. GCMNO sends the message to the corresponding Home Carrier for authentication. The PED may also initiate or restart authentication by sending an EAPOL-Start frame to the access point, which will then reply with an EAP-Request Identity frame.

EAP negotiation operations are now described. Hotspot 2.0 requires mobile devices and access points to support a minimum set of EAP authentication operations. The authentication server sends a reply (encapsulated in a RADIUS Access-Challenge packet) to the WAP, containing an EAP Request specifying the EAP Method (The type of EAP based authentication it wishes the PED to perform). The WAP encapsulates the EAP Request in an EAPOL frame and transmits it to the PED. At this point the PED can start using the requested EAP Method, or do an NAK ("Negative Acknowledgement") and respond with the EAP Methods it is willing to perform.

Authentication operations are now described. If the authentication server and PED agree on an EAP Method, EAP Requests and Responses are sent between the PED and the WAP until the authentication server responds with either an EAP-Success message (encapsulated in a RADIUS Access-Accept packet), or an EAP-Failure message (encapsulated in a RADIUS Access-Reject packet). If authentication is successful, the WAP sets the port to the "authorized" state and normal traffic is allowed, if it is unsuccessful the port remains in the "unauthorized" state. When the PED logs off, it sends an EAPOL-logoff message to the WAP, the WAP then sets the port to the "unauthorized" state, once again blocking all non-EAP traffic.

Figure 7:
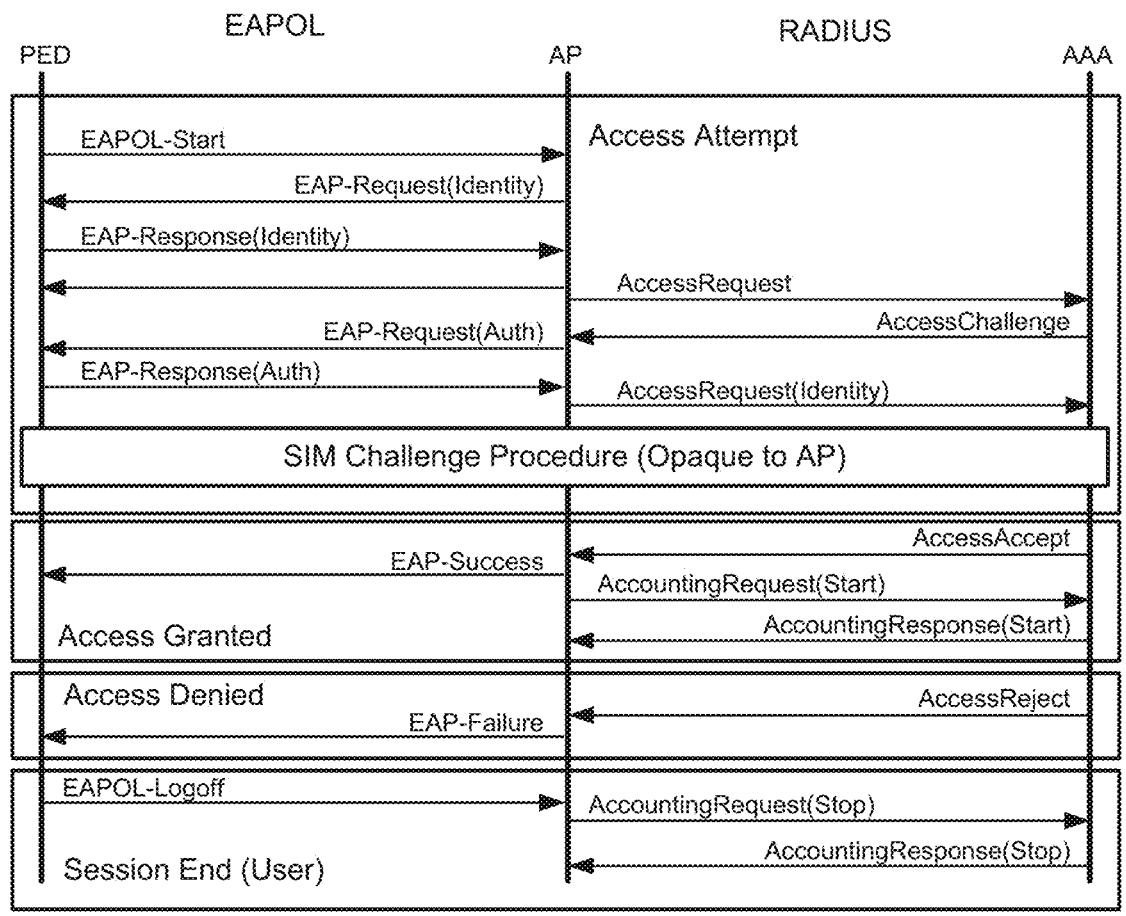
FIG. 7 illustrates a data flow diagram for an AAA procedure with communications between a PED, a WAP (illustrated as "AP"), and an AAA proxy in accordance with some embodiments.

FIG. 7 illustrates a data flow diagram for an AAA procedure with communications between a PED, a WAP (illustrated as "AP"), and an AAA proxy in accordance with some embodiments.

Figure 8:
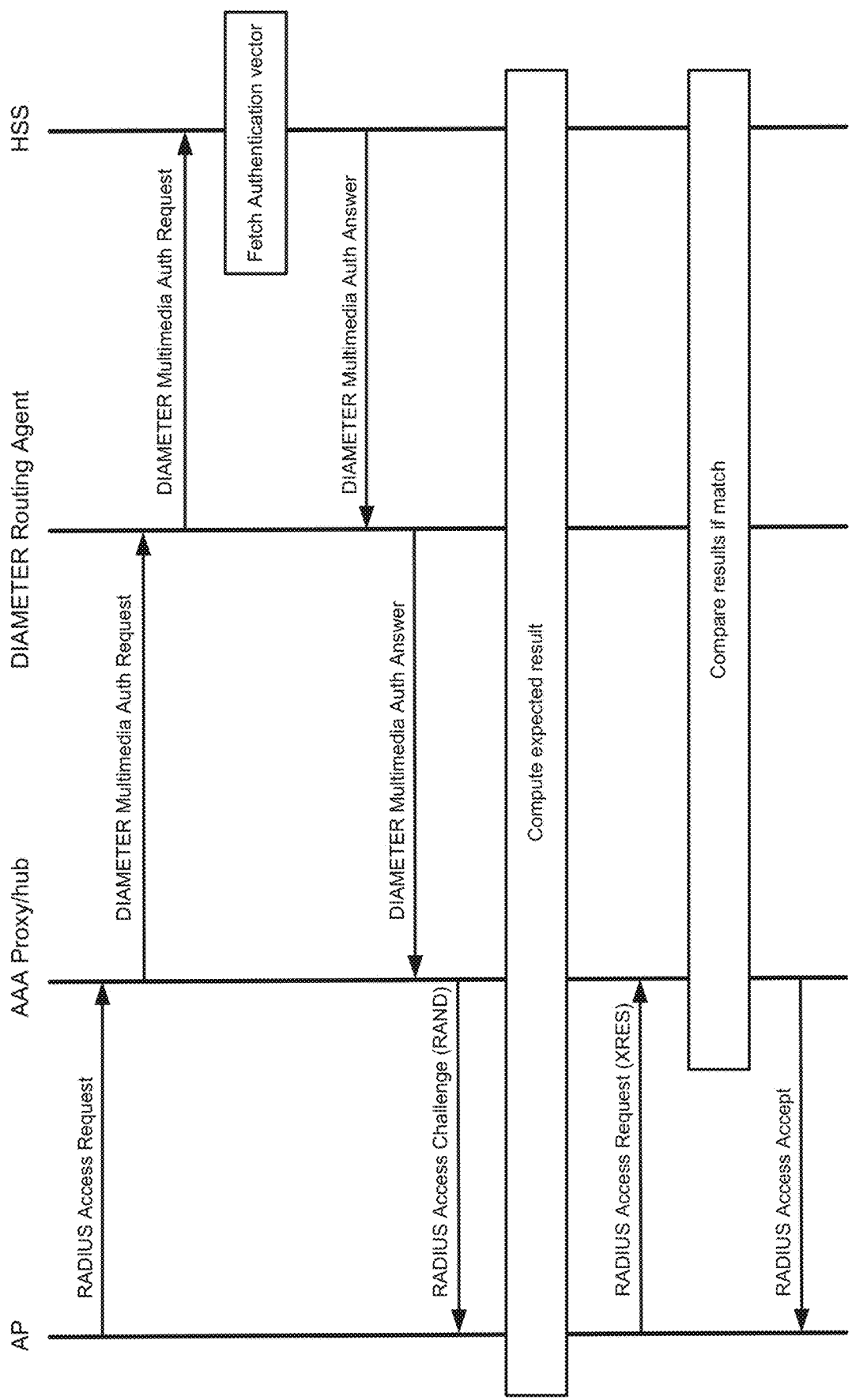
FIG. 8 illustrates a data flow diagram for a SIM challenge procedure with communications between a PED, a AAA proxy/hub, a DIAMETER routing agent, and a HSS in accordance with some embodiments.

FIG. 8 illustrates a data flow diagram for a SIM challenge procedure with communications between a PED, a AAA proxy/hub, a DIAMETER routing agent, and a HSS in accordance with some embodiments.

7. Wi-Fi Calling Session Establishment

Figure 9:
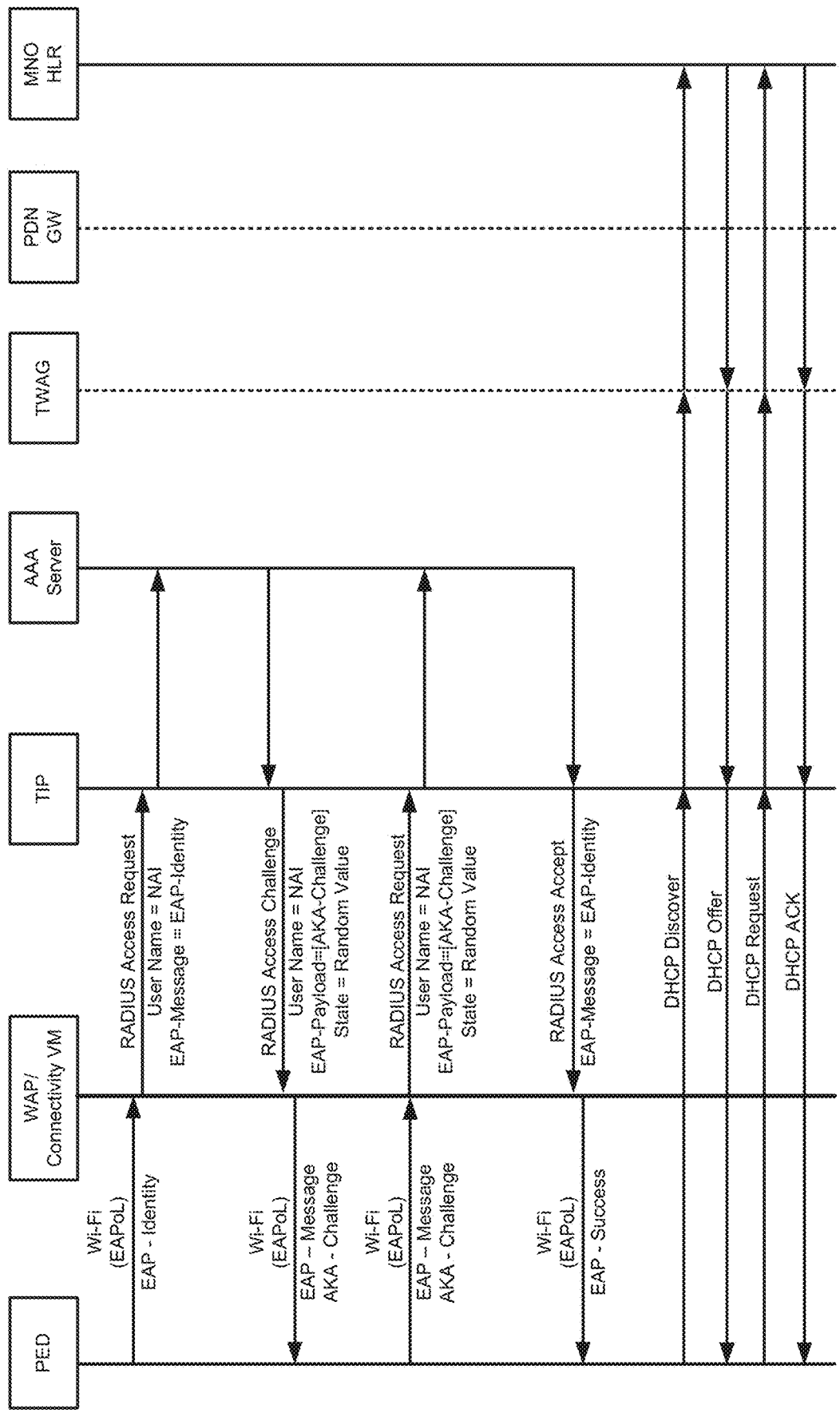
FIG. 9 illustrates a data flow diagram for a Wi-Fi calling session establishment with communications between a PED, WAP/connectivity VM, interconnect point (illustrated as "TIP"), AAA server, TWAG, PDN GW, and MNO HLR in accordance with some embodiments.

FIG. 9 illustrates a data flow diagram for a Wi-Fi calling session establishment with communications between a PED, WAP/connectivity VM, interconnect point (illustrated as "TIP"), AAA server, TWAG, PDN GW, and MNO HLR in accordance with some embodiments.

The procedure for Wi-Fi access/authentication, authorization, and accounting can be broken down into the following parts:

1) HS-2.0 Access point selection at the WAP;
2) 802.1x PED authentication at the WAP;
3) RADIUS authentication, authorization and accounting between the WAP and the roaming hub AAA Server;
4) RADIUS/DIAMETER authentication, authorization and accounting between the roaming hub AAA server and the home provider;
5) Once the PED is authenticated, PED issues the DHCP request to get the carrier IP; and 6) Connectivity server which includes a software component that provides connectivity services, where the software component is also referred to as "FlytNet" herein. The software component intercepts the DHCP response, and sets up the in-flight roaming service including the mapping of carrier IP and the LAN IP for the PED. Once this successful, it sends the DHCP response to PED.

8. Crew Control of In-Flight Roaming Service

The aircraft crew can be provided the capabilities to enable and disable the text and calling service via the iCMT. To disable the VoWiFi traffic flowing, the connectivity server can operate to disable the tunnel network path which in turns terminates all talk and text functionality. Note that this does not include authentication traffic which flows over a different path.

9. Geo-Fence

The aircraft network may be configured to be disabled to comply with geo-fencing regulations. The connectivity server can disable the tunnel network path which in turns terminates all talk and text functionality.

10. Aggregator

To simplify the management of authenticating with different carriers who may have diverse authentication protocols, as well as simplifying the billing and reporting management, an aggregator partner, such as ZephyrTel™, can be used to support diverse authentication, security, and identity management protocols. The aggregator partner can operate to provide authentication for Wi-Fi roaming providers. Aggregation partner may operate to provide the fan out for authentication and authorization, and implement the accounting procedures as well. During setup, the authentication requests arrive at the hub, and the user ID (IMSI) is analysed. Based on the analysis, the request is forwarded to the correct home system for processing. The result of the authentication procedure is used to grant or reject access to the system (authorization).

11. Quality of Service (QoS)

Additional prioritization are placed on detected in-flight roaming voice call traffic to help ensure reduced latency, loss, and jitter, e.g, because voice traffic is interactive. That is, the traffic are mapped to an appropriate low-latency QoS when traversing the satellite backhaul. SMS and MMS traffic is considered non-real-time, best effort, and/or low priority and requires no special treatment at the interconnect point or on by the aircraft cabin communication system.

Figure 10:
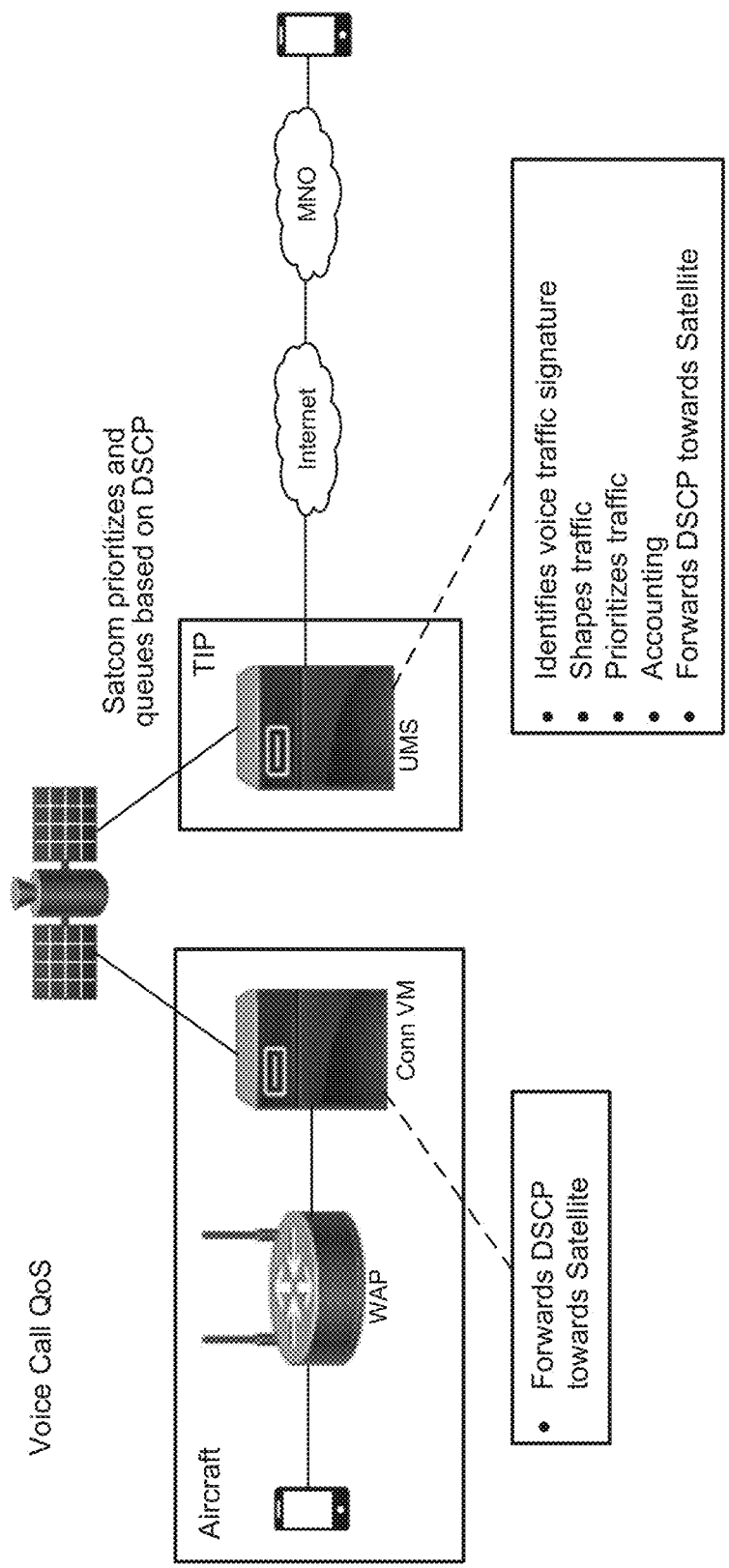
FIG. 10 is a block diagram of some components of the aircraft cabin communication system and the ground-based communication system which operate to control QoS in accordance with some embodiments.

FIG. 10 is a block diagram of some components of the aircraft cabin communication system and the ground-based communication system which operate to control QoS in accordance with some embodiments. Connectivity Server and interconnect point ("TIP") UMS component will set proper DSCP value to the IP header of the EoGRP tunnel traffic itself. The DSCP stamping is not done for PED traffic because all of them are encapsulated inside the EoGRE tunnel. This QoS setting are honoured by all equipment between the Connectivity Server on wing, and the UMS component on the ground.

By taking into considerations of all the traffic in the system, the illustrated system of FIG. 10 can provide the QoS setting for the in-flight roaming traffic, including:

1. Over SES network, both Connectivity Server and TIP UMS component needs to tag the traffic with DSCP value 34.
2. Over Inmarsat GX network, as the in-flight roaming (also referred to as "InFlytRoam") traffic is via UDP, both connectivity server and interconnect point (also referred to as "TIP") UMS component needs to tag the traffic with DSCP value 34. This puts this type of traffic in to P3 over GX network.
3. No additional shaping/throttling rules are applied on the InFlytRoam traffic.

The following rules can be used by Connectivity Server to classify the traffic: all traffic on VLAN for InFlyt Roam SSID.

The following rule can be used by SES Hughes Modem configuration to classify the traffic:
IPv4
IPv4 header field "Protocol" with value for GRE (0x27 in Hex or 47 in Decimal).
DSCP stamp allocated for VoWi-Fi. This can be a common design for both SES and GX.
This traffic is mapped to COS2 in Hughes Modem.
These traffic is non-TCP traffic The following rule can be used for TIP UMS component to identify the InFlytRoam traffic:
GRE protocol 47
The tunnel endpoint IPs.

12. Reporting

For real time reporting, the connectivity server can provide service status over the THI to iCMT upon request. For historical data reporting, by using the aircraft logs, the ground system will report user count and bandwidth usage, and SLA, at flight, tail and fleet levels. MNO reports can be manually generated and provided to the aircraft operator and/or MNO through, e.g., ZephyrTel™ eAnalytics portal.

13. SLA Reporting

The cabin network SLA may be measured monthly or at another defined interval as a percentage during service window. Service window for any connectivity related service may be defined as the total flight time above 10,000 ft. The SLA per month may be measured using the following calculation:

Availability=1−[(Downtime−Exclusions)/(Total Flight Time)]

|  | Unit of Time (UoT) | Log Value |
|---|---|---|
| Availability of Connectivity VM^ * | Ax-CONN | HotSpot Enabled |
| WAP (H/W) Availability | Ax-WAP | Minimum WAP count |
| Passpoint Service Availability | Ax-PASS | IFRStatus |

The service availability for each element in the table may be measured and recorded every x Unit of Time (UoT) for the duration of the flight within the service window. At the time of measurement, each element in the service provision chain may assigned a value of "1" if working as expected and a value of "0" in case of a failure. (Internal) If there is no passenger impact as a result of recorded service failure then the failure may be excluded from SLA calculation. The SLA calculation system may use IFR health and usage data to determine if any passenger attempted to use any IFR features (Voice, Text or Data) during a given interval of time.

Note that the SLA exclusions may need to be added in the SLA calculation. This includes but not limited to: Service unavailability due to SATCOM coverage; Service unavailability due to Ground/air control (The on-wing personnel is able to disable the service as needed. In the future work, ground personnel (such as NOC) will be provided this function on system wide, as well as tail specific); and Service unavailability due to geofencing, as the service may be available but disallowed, depending on the regulatory environment a particular tail is operating within.

14. Security and Data Privacy

In terms of security and data privacy, the passenger traffic may be segregated by VLANs, and the WAP's maintenance network can be configured to not be reachable from the user Wi-Fi network. The authentication message can be sent via the IPSec tunnel established between the interconnect point and the AAA server. The cabin network call and text traffic between the PED and the carrier is encrypted, and can be exchanged via the the EoGRE tunnel.

In addition, the impact of the InFlytRoam feature is also added into a security framework, including: unauthorized access to all Wi-Fi calling infrastructures is prevented, e.g., firewall blocking access to unauthorized ports; and security logs can be created, including logs on user authentication failures to the CWAP, IPsec tunnel creations and other security critical events.

15. Security and Data Privacy

Figure 11:
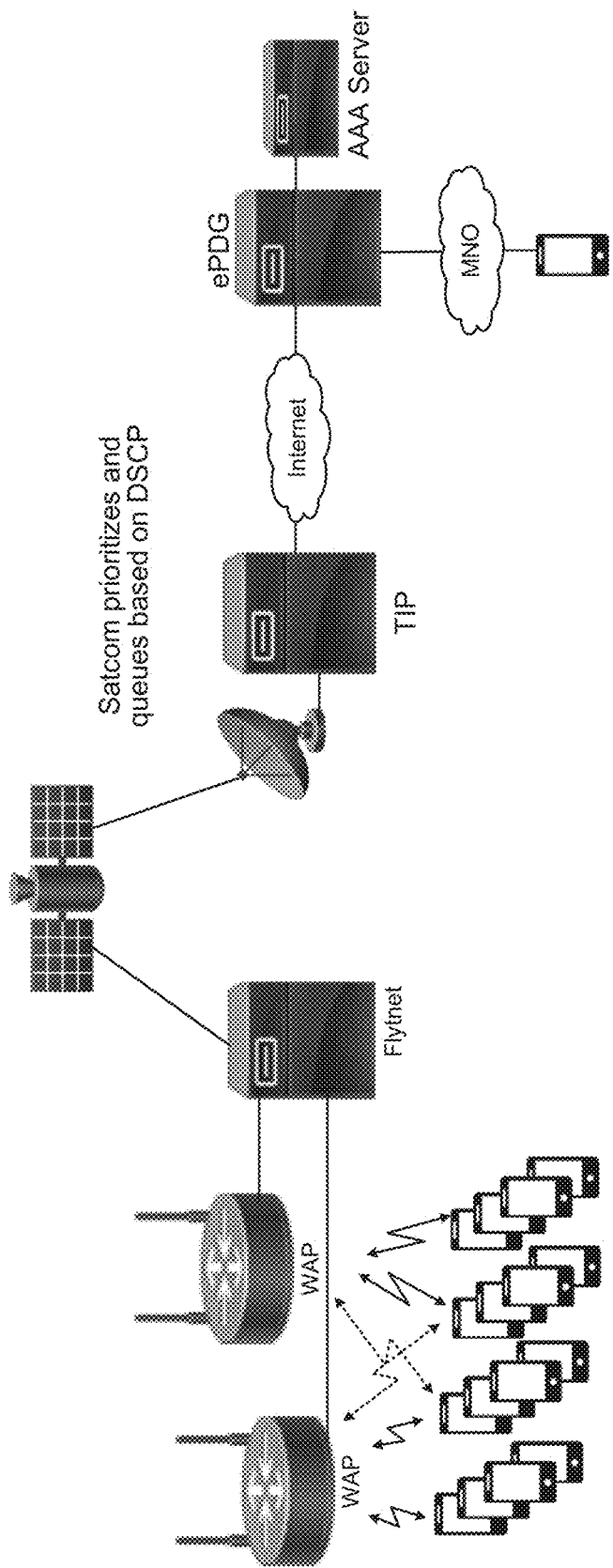
FIG. 11 is a block diagram of a physical architecture of the aircraft cabin communication system, satellite communication network, and ground-based communication system in accordance with some embodiments.

FIG. 11 illustrates a block diagram of a physical architecture of the aircraft cabin communication system, satellite communication network, and ground-based communication system in accordance with some embodiments.

Referring to FIG. 11, the WAP connects passengers via HS2.0 and sends AAA Authentication messages to the AAA server. The connectivity server (also referred to as "FlytNet") identifies voice call traffic and marks the Differentiated Services Code Point (DSCP) value, which is a packet header value that can be used to request (for example) high priority or best effort delivery for traffic. The aircraft modem forwards voice traffic towards an aircraft antenna for buffering in a low latency queue for transmission toward the satellite network. The ground modem or terminal (ground station operated by a SATCOM provider) forwards voice call traffic towards the SATCOM public antenna in a low latency queue. The interconnect point marks the DSCP value for voice traffic towards the satcom equipment. The AAA aggregator (AAA server) receives AAA messages from the WAP, and authenticates users with a wireless carrier network provider (MNO) which is associated with the passenger's PED. The firewall, which can be part of the interconnect point, can operate to only allow specific AAA traffic between the WAPs and the AAA server. If the AAA server is located within a data center, a VPN tunnel can be established between the firewall and the interconnect point. The bridge or router identifies and routes voice over Wi-Fi (VoWiFi) traffic, both on-board the aircraft and at the interconnect point.

16. WAP Configurations

WAP configuration may include the following: Hotspot 2.0 configuration (including updates); AAA configuration (including updates); and the WAPs are configured with 2 SSIDs. One of the 2 SSIDs (SSID 1) already exists and is used for portal access or Internet access. The second one of the 2 SSIDs, the second hidden SSID, is configured with HS2.0 and used exclusively for voice calling and texting for users that do not pay for a data plan. WAP example configuration to support Passpoint (hotspot 2.0).

17. Connectivity Server Configurations

The connectivity server includes a software component that provides connectivity services, where the software component is also referred to as "FlytNet" herein. The software component can provide connectivity services that include: enabling the VoWiFi auto connect; routing configuration that routs the in-flight PED roaming voice and text traffic differently from other traffic; and mark the DSCP value for traffic that is destined towards the modem with the appropriate DSCP value. The DSCP value will vary depending on the satellite carrier. The connectivity server should also be configured to provide an accounting and logging function for VoWiFi traffic.

18. Satcom Configurations the satcom network does not need additional configurations in most cases. The satcom network will forward VoWiFI traffic and prioritizing queue voice traffic based on the DSCP value marking.

19. Interconnect Point UMS Component Configuration

The interconnect point UMS Component needs to be configured to perform the corresponding DSCP tagging based on the GRE protocols and the GRE endpoints. It also needs to ensure no rate control on the in-flight PED roaming traffic, while ensuring the existing shaping and DSCP tagging on the normal internet data not being impacted.

20. Security Configurations

The firewall will need to establish an IPsec VPN tunnel to the clearing house firewall for AAA messages.

21. Areas for Further Optimizations

Internet and other data access functions can be optimize in accordance with some embodiments. Upon successful seamless authentication, all non-voice and text data are redirected to the portal for re-authentication. Upon user redirection to the portal, the portal will display multiple user plans for the user to access data connectivity while inflight. The development of a new user plan for in-flight roaming or Carrier-billing to support those users that opt for carrier-billed connectivity option versus those that select the airline or other billed portal plans. In addition to voice and text functionality being subject to roaming rates while in the in-flight roaming service network, all non-voice and text data consumption will be subject to roaming rates upon selection of the in-flight roaming portal connectivity plan.

In one embodiment it is possible to have both in-flight roaming RPI and normal Internet Plan RPI co-exist on one PED. The design ensures the interconnect point UMS component can still handle the subscriber mapping and shaping is controlled and documented.

22. Service Billing

An important aspect of the in-flight roaming (also referred to as "InFlytRoam") service is the billing of usage by the home carrier. It is possible to enter an agreement with a clearinghouse for billing, but that likely wouldn't handle the authentication/authorization real-time feeds. Billing may be implemented by the Wi-Fi operator directly, or by the home service provider as part of their normal billing process. Time spent and/or data volume consumed while in the Wi-Fi coverage area is accounted for, and charged as per negotiated agreements.

The data usage provides the revenue for the operator associated with the airline, the airline, and the carrier partner. One option is that all RADIUS messages, authentication and accounting will be routed through the AAA server. After successful authentication, when the carrier receives an AAA Accounting-Start, the aggregator or carrier should mark the subscriber as subject to data charges by using the access network. When the aggregator or carrier receives a subsequent Accounting-Stop (or on predetermined timeout), the aggregator or carrier should cease charging.

A clearing house partner, such as a service provided by ZephyrTel™, generates TAP records based on the accounting data. Accuris™ will then reconcile the accounting records with the carrier partner. In this scenario the operator associated with the airline will rely on Accuris™ to ensure usage and billing records are accurate. The operator associated with the airline then will receive payment from the partner carrier in accordance with the commercial agreements.

Partnering with the provider GCMNO, the operator associated with the airline can leverage the authentication and authorization feeds, as well as the roaming and billing (accounting) agreements that provider already has in place with other carriers.

The carrier may assume a different charge rate for data passed when using the access network, as necessary (typically a "roaming rate"). The home carrier may not charge for call minutes at all, in which case the data usage may be applied towards the subscriber's data plan. The charging details are specific to each carrier, and are beyond the scope of this document. However, it is typical to notify a subscriber that they are subject to roaming rates when the cost of service is outside the user's normal billing rates. Because of this, the subscriber is sent a roaming notification text once service is established.

Simple billing through Wi-Fi Carrier offload providers enabled and supported by appropriate roaming partner agreements. This requires the integration with SAP.

In the scenarios where the operator associated with the airline is revenue sharing or selling bandwidth to an airline there will be an additional step of reconciliation of data and billing by the operator associated with the airline. In the future, it is needed to identify the billing mechanism between split billing or unified billing.

Split billing is the concept where the subscriber is billed for VoWiFi usage via their home carrier, and generic IP data usage via the captive portal. It is critical that accurate information be sent to the home carrier. Accounting messages emitted from the WAP include all data to/from the PED. In a split billing configuration, these messages must be rewritten to accurately reflect data transferred with the home carrier, rather than all data exchanged with the WAP.

Unified billing is the concept where the subscriber is billed for ALL Wi-Fi data usage, not just tunnelled traffic to the home carrier. If unified billing for generic IP data usage as well as VoWiFi is desired, then generic data usage must be blocked until the tunnel is established, and the notification text delivered.

Other embodiments are directed to sending RADIUS accounting message to Accuris via ground AAA or on-board proxy. Identifying how the RADIUS accounting messages are to be stored in the operator associated with the airline. The RADIUS accounting messaging between on-board and the Accuris server traverses Sandvine, which sniffs out the AAA traffic. It is needed to ensure this is not causing regression on the UMS traffic shaping policies for the internet service, which setup the user tiered session based on the intercepted RADIUS Accounting message sent by FlytNet for the internet service setup. Traffic classification so that the accounting for VoWiFi can be done separately (if applicable).

It is possible that the billing may start before the IPsec tunnel is established between the PED and the home carrier's enhanced Packet Data Gateway (ePDG) and the roaming notification text sent, since the WAP is likely to generate RADIUS Accounting Start messages when data begins to flow. It is worth to see whether those RADIUS messages should be intercepted and held, and accounting to be started until after a configurable delay after tunnel establishment (to allow reasonable time for the roaming notification text to be delivered). If the timeout expires without tunnel establishment, then billing must never be started (RADIUS accounting messages discarded). It is assumed that the user agrees to carrier billing if the tunnel is established, and any data flows across the tunnel after the notification delay. If the timeout expires with the tunnel remaining established, then billing should begin (by forwarding the Accounting messages, possibly with modifications). This procedure may be the aircraft cabin communication system or the ground-based communication system.

23. Alternative In-Flight Roaming Architectures

Some other embodiments are directed to alternative ways to grant seamless access to Wi-Fi calling on-board the aircraft. The list below defines the major alternative operational solutions, but it should be noted that combinations of the operations are also possible. It is believed that the solutions are ordered by increasing cost:

Solution 1) Free access to calling via a carrier whitelist—FlytNet today allows an end user to associate to the hotspot at will. The end user, upon attempting to use any Internet service, is blocked from using that service until the passenger engages with the captive portal and acquires (purchases, if required) a data plan. Instead of blocking access to the ePDG (enhanced Packet Data Gateway) addresses of the various carriers, the ePDGs could be whitelisted (via DNS lookup of 3gppnetwork.org if necessary) and the IPsec tunnel setup to the ePDGs could be passed through.

Solution 2) Carrier direct Wi-Fi authentication and billing—Thales may build or buy a AAA proxy/roaming platform with direct connects to carriers that Thales has entered into roaming/billing agreements with. Subscribers of those carriers may be authenticated upon Wi-Fi access (via a HS-2.0 enabled AP/SSID) via a SIM challenge carried out in conjunction with the carrier's HSS. Charging is part of AAA messaging; charging will leverage that AAA traffic for automatic billing of Wi-Fi access.

Solution 3) Service bureau for Wi-Fi authentication and billing—Thales may build or buy (as above) a AAA proxy with a connection to a AAA aggregator/clearinghouse that has existing billing relationships with many carriers. Thales leverages the existing billing agreements between the aggregator/clearinghouse and the carriers to increase the subscriber coverage.

Solution 4) Service bureau/carrier partner, local breakout—a carrier partner is selected, and a business relationship is created for a particular carrier to offload the full set of non-3GPP access procedures onto their network. The carrier is responsible for Wi-Fi authentication, billing, and full-blown mobile roaming procedures for any subscriber from the carrier's network, or any subscriber from a network provider for which the selected carrier has a roaming agreement.

The choice of which solution to use has many trade-offs, but the most comprehensive solution that minimizes up front cost is Solution 4.

24. Alternative WiFi Access to the Carrier Network

In an untrusted model, the carrier can make no assumption about the authenticity of the Wi-Fi access, or how it was gained. In other words, the carrier does not necessarily trust the Wi-Fi provider. This is typically the use case for the VoWiFi service as provided by carriers—the carriers do not trust that the Wi-Fi provider (normally, home or business Wi-Fi) has strongly authenticated the Wi-Fi user, so the carrier is obligated to rigorously check the user's identity. The home carrier and the PED implement the IPsec functionality required to establish a secure connection between the PED and the carrier. Part of the establishment is an EAP-AKA' challenge during tunnel setup; it is this challenge that establishes the trust relationship between the PED and the home carrier, regardless of the Wi-Fi provider.

In a hybrid approach, in an aircraft environment, where the cellular network radios are disabled, the carrier network would like to use the functionality provided by VoWiFi, which requires the untrusted model, while billing for data usage via the carrier, which requires the trusted model. To solve this problem, a hybrid approach is taken. In the hybrid approach, the Wi-Fi network is trusted (because of the EAP-AKA' challenge to establish Wi-Fi service), but the PED is still expected to establish an IPsec tunnel to the home network's ePDG for Wi-Fi Calling service (SWu). The roaming hub provides the TWAG function, and routes some or all data to the home network (home routing), including the IPsec traffic for Wi-Fi calling. The roaming hub implements the fanout for VoWiFi traffic flow to all supported home carriers, and potentially all data flow. Once the mobile is authenticated and authorized in the Wi-Fi network, the PED is assigned an IP address, and some set of user data is allowed to flow (defined by Thales policy, in the Wi-Fi Access Network). At this point, the second phase of Wi-Fi calling can be initiated—the establishment of the IPsec tunnel between the mobile and the home network (PED to enhanced Packet Data Gateway [ePDG]). It should be noted that the PED may need normal DNS services to initiate this connection—it may need to look up the IP address of the ePDG by name, depending on its configuration.

25. Operations by WAP and Connectivity Server Components of Vehicle Cabin Communication System FIGS. 12-16 are flowcharts of operations that can be performed by a WAP and connectivity server components of a vehicle cabin communication system in accordance with some embodiments. As explained above, the vehicle cabin communication system may be an aircraft cabin communication system, a ship cabin communication system, and/or a train cabin communication system.

Figure 12:
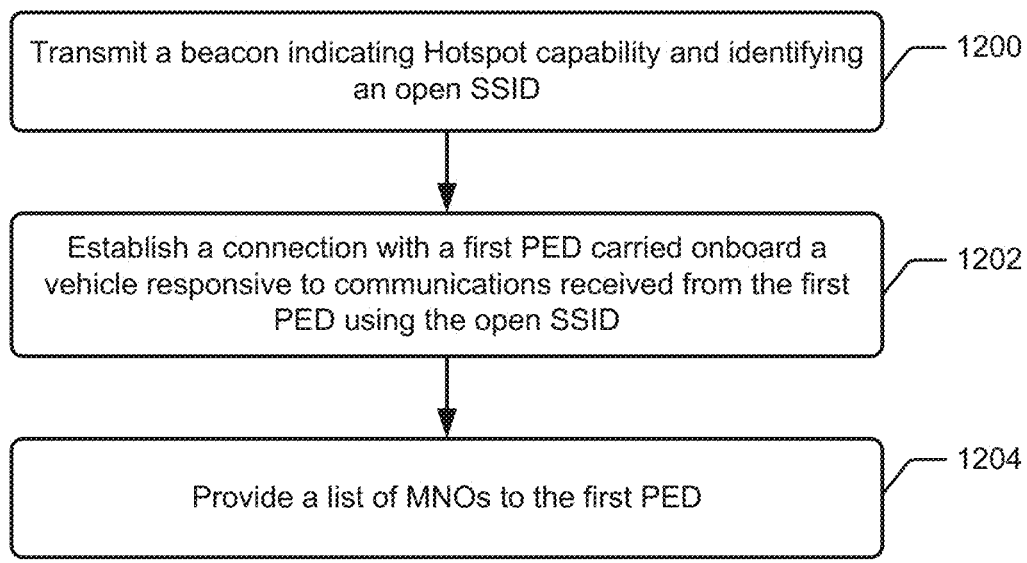
FIGS. 12-16 are flowcharts of operations that can be performed by a WAP and connectivity server components of an aircraft cabin communication system in accordance with some embodiments.

Referring to FIG. 12, the WAP can be configured to operate to transmit 1200 a beacon indicating Hotspot capability and identifying an open SSID. The WAP can further operate to establish 1202 a connection with a first PED carried onboard a vehicle responsive to communications received from the first PED using the open SSID. The WAP can further operate to provide 1204 a list of mobile network operators (MNOs) to the first PED.

Figure 13:
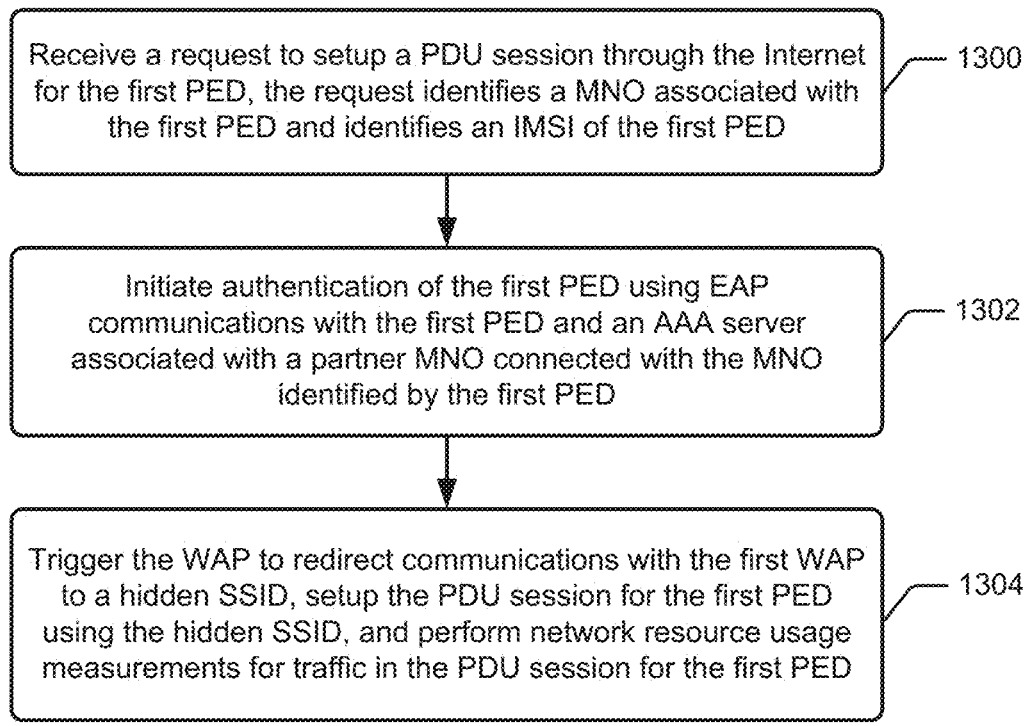

Referring to FIG. 13, the connectivity server can be configured to operate to receive 1300 a request to setup a protocol data unit (PDU) session through the Internet for the first PED, wherein the request identifies a MNO associated with the first PED and identifies an international mobile subscriber identity (IMSI) of the first PED. The connectivity server can further operate to respond to the request to setup the PDU session for the first PED, by initiating 1302 authentication of the first PED using extensible authentication protocol (EAP) communications with the first PED and an AAA server associated with a partner MNO connected with the MNO identified by the first PED. The connectivity server can further operate 1304 to respond to the AAA server granting access to the first PED, by triggering the WAP to redirect communications with the first WAP to a hidden SSID, setting up the PDU session for the first PED using the hidden SSID, and performing network resource usage measurements for traffic in the PDU session for the first PED.

The connectivity server may be further configured to report the network resource usage measurements to the partner MNO connected with the MNO identified by the first PED. The partner MNO connected with the MNO may operate as a clearinghouse to provide charging for passenger PED resource usage of satellite networks and/or other airline networks to MNOs (e.g., Verizon™, AT&T™, T-Mobile™, etc.) with which the partner MNO has established agreements.

The list of MNOs provided 1204 by the WAP may include a list of roaming consortium organization identifiers (OIs).

The WAP may be configured to support Hotspot 2.0 roaming and transmit 1200 an indication of Hotspot 2.0 capability.

As explained above, the operator associated with the airline may provide some limited services for PED voice calls and Short Message Service (SMS) via a satellite communications, based on passenger's premium seat and/or passenger's airline membership status, etc. Thus, for example as shown in FIG. 14, prior to receipt of the request, the connectivity server can be configured to respond 1400 to receipt of an earlier request to send a text message for the first PED or to setup a voice call for the first PED, by sending the text message or setting up the voice call without sending a query through the WAP to the first PED which requests the passenger operating the first PED to authorize making charges for the text message to the voice call to the operator associated with the vehicle or to the MNO identified by the first PED.

An initial attempt by the PED to access the Internet (e.g., starting-up a web browser, social media application, game, etc., that attempts to setup a PDU session through the Internet) can be initially blocked and trigger the connectivity server to send a query through the WAP to the PED requesting a passenger operating the PED to authorize making charges for a PDU session through the Internet to an operator associated with the vehicle or to the MNO identified by the first PED. Referring to the example of FIG. 14, the connectivity server can be configured to operate to respond 1402 to receipt of the request to setup the PDU session for the first PED, by sending a first query through the WAP to the first PED requesting a passenger operating the first PED to authorize making charges for the PDU session to an operator associated with the vehicle or to the MNO identified by the first PED. The connectivity server can further operate to respond 1404 to a reply from the first PED authorizing making charges for the PDU session to the MNO identified by the first PED, by initiating the authentication of the first PED using the EAP communications with the partner MNO connected with the MNO identified by the first PED.

Based on receiving the grant from the AAA server, the connectivity server can be configured to perform charging to the partner MNO connected with the MNO identified by the first PED based on the network resource usage measurements for traffic in the PDU session for the first PED.

Figure 14:
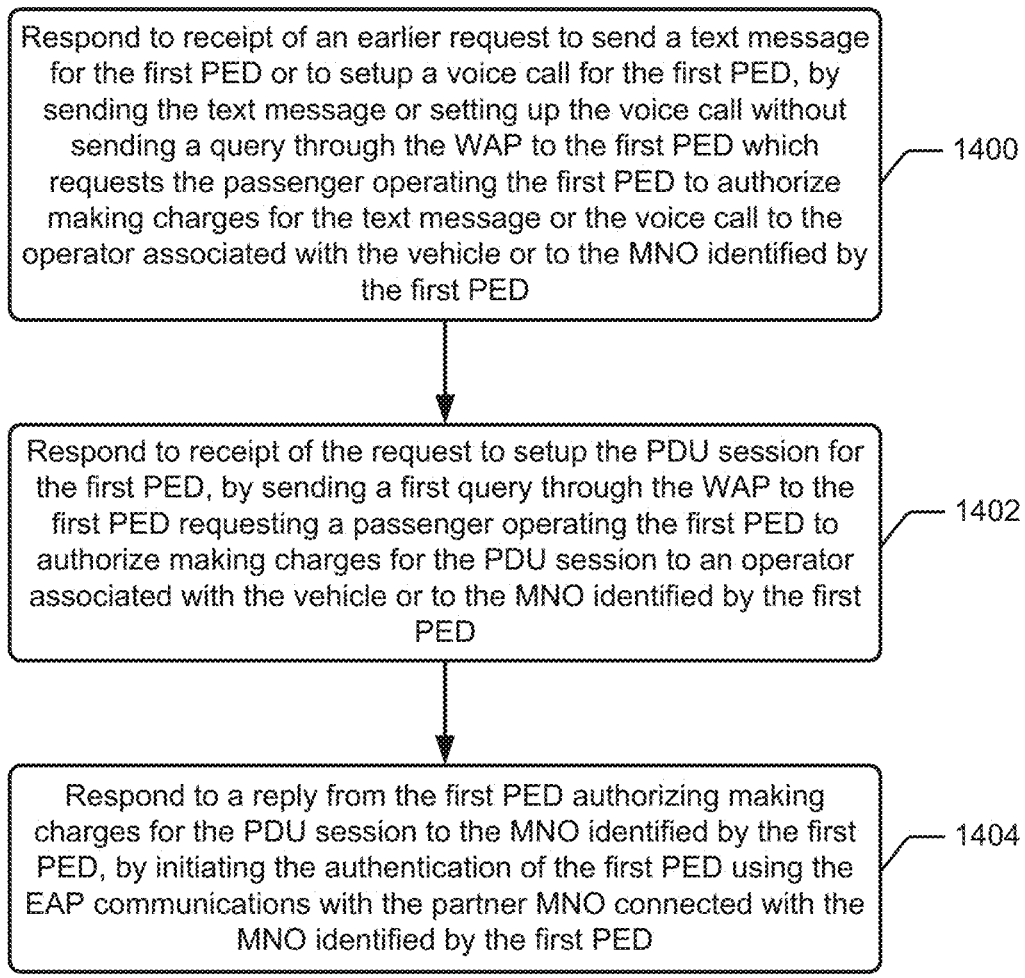
Figure 15:
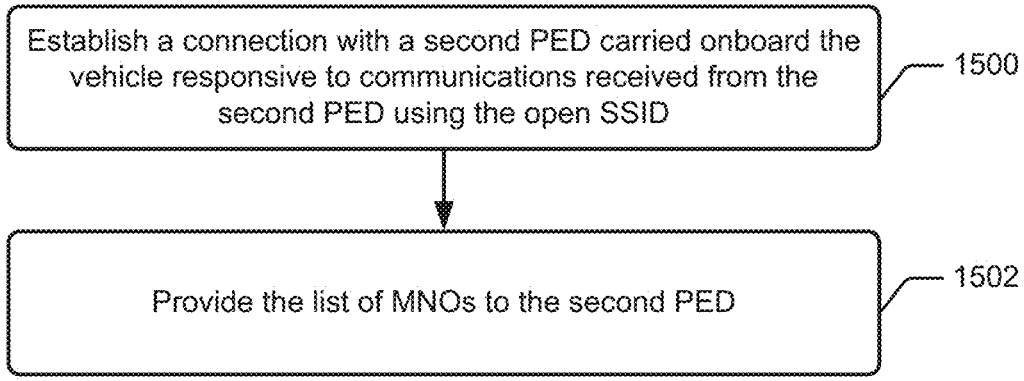
Figure 16:
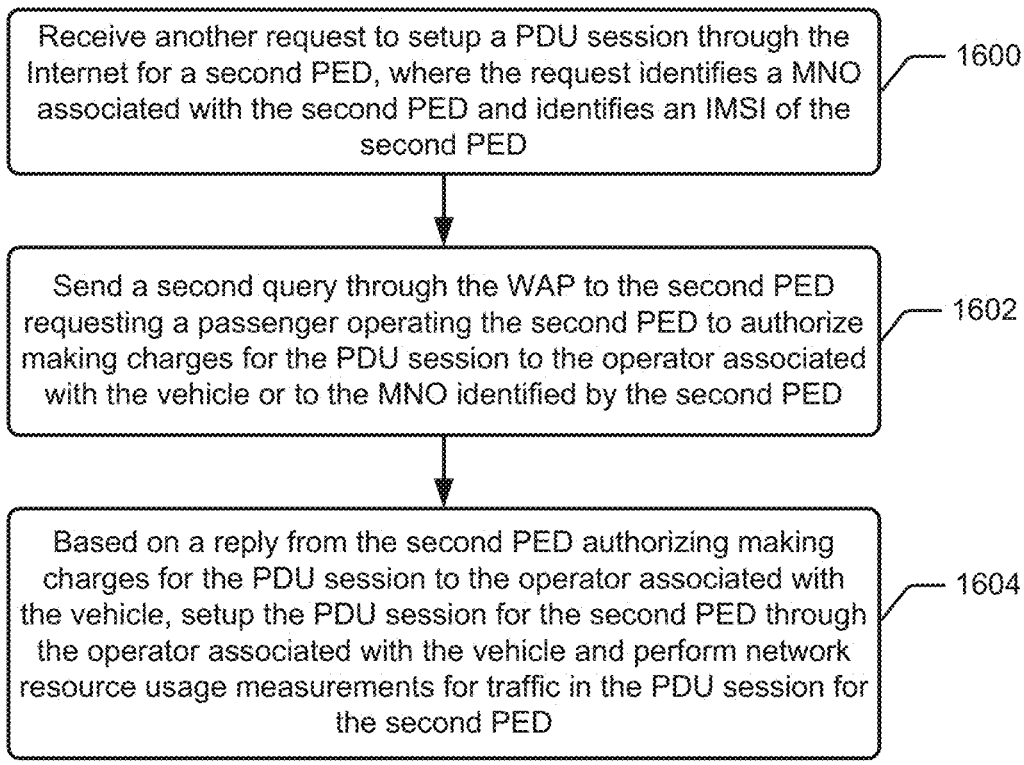

FIGS. 15 and 16 are flowcharts of operations that can be performed by the WAP and the connectivity server, respectively, for another scenario where a passenger using another PED ("second PED") response to a charging query by authorizing charging to an operator associated with airline, in contrast to the scenario of FIG. 14 where charging was authorized the MNO associated with the PED.

Referring to FIG. 15, the WAP establishes 1500 a connection with a second PED carried onboard the vehicle responsive to communications received from the second PED using the open SSID. The WAP provides 1502 the list of MNOs to the second PED.

Referring to FIG. 16, the connectivity server receives 1600 another request to setup a PDU session through the Internet for a second PED, wherein the request identifies a MNO associated with the second PED and identifies an IMSI of the second PED. The connectivity server responds 1602 to receipt of the request to setup the PDU session for the second PED, by sending a second query through the WAP to the second PED requesting a passenger operating the second PED to authorize making charges for the PDU session to the operator associated with the vehicle or to the MNO identified by the second PED. The connectivity server operates 1604, based on a reply from the second PED authorizing making charges for the PDU session to the operator associated with the vehicle, to setup the PDU session for the second PED through the operator associated with the vehicle and perform network resource usage measurements for traffic in the PDU session for the second PED.

The connectivity server can be further configured to perform charging to the operator associated with the vehicle based on the network resource usage measurements for traffic in the PDU session for the second PED.

26. Operations by Interconnection Point Component of Ground-Based Communication System to Support Communications of PEDs Onboard Passenger Vehicles corresponding operations it can be performed by interconnection point component of a ground-based communication system to support communications of PEDs onboard passenger vehicles will now be described.

Figure 17:
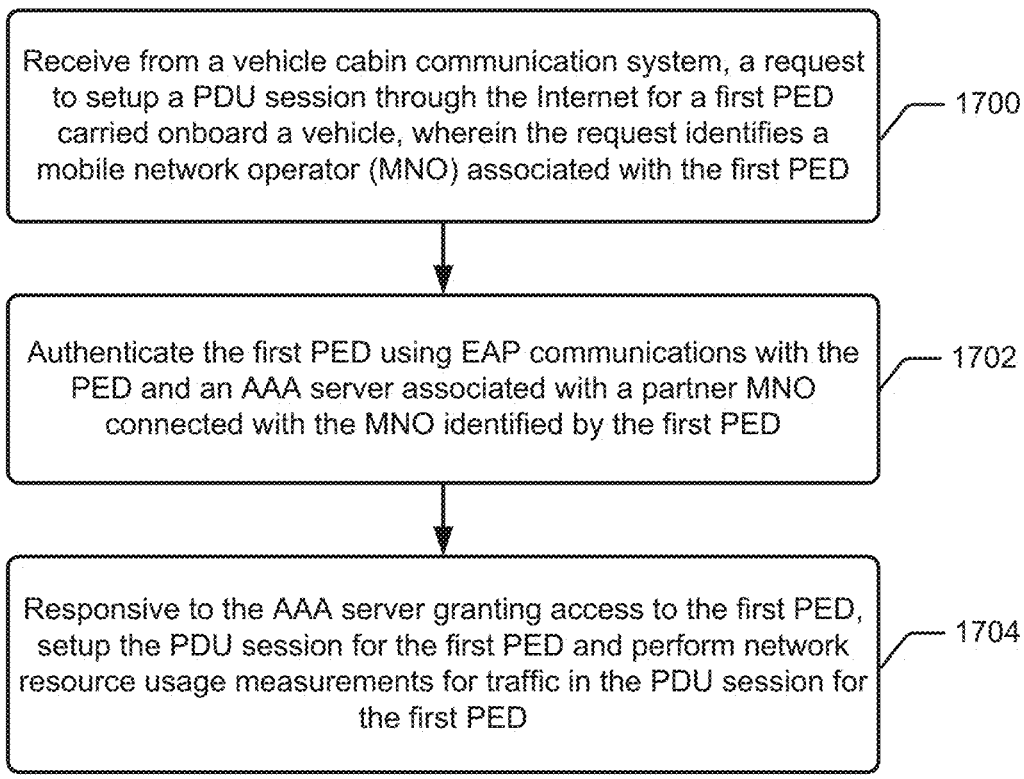
FIGS. 17-19 are flowcharts of operations it can be performed by interconnection point component of a ground-based communication system in accordance with some embodiments.
Figure 18:
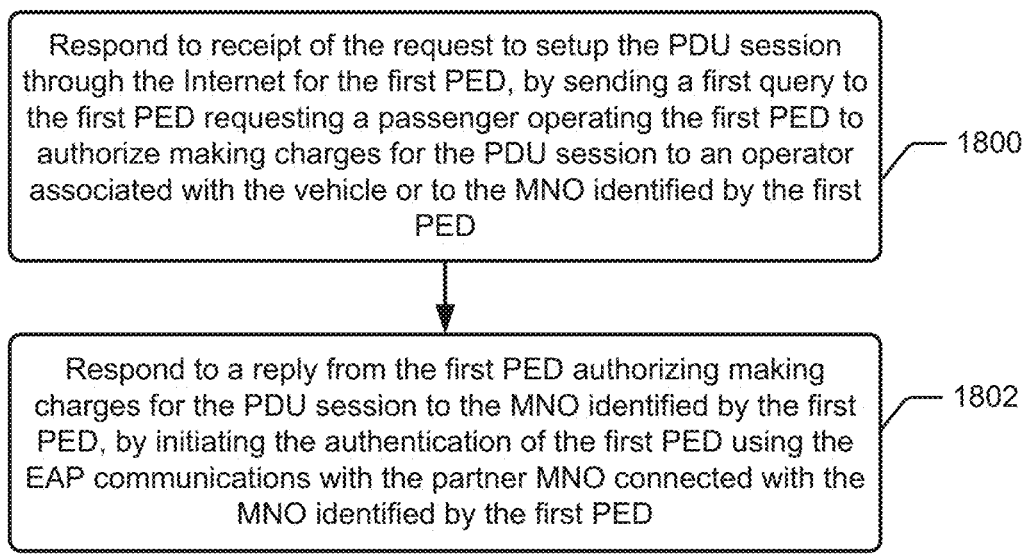
Figure 19:
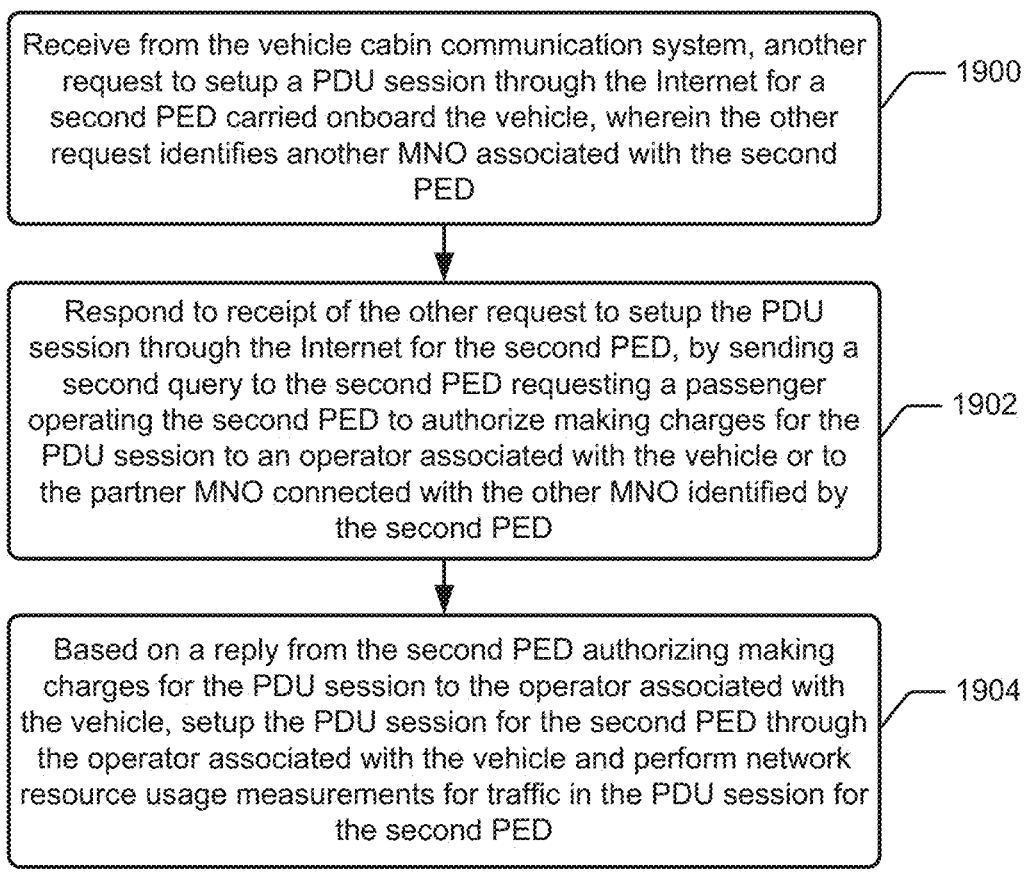

FIGS. 17-19 are flowcharts of operations that can be performed by interconnection point component of a ground-based communication system in accordance with some embodiments.

Referring to FIG. 17, interconnection point can be configured to operate to receive 1700 from a vehicle cabin communication system, a request to setup a protocol data unit (PDU) session through the Internet for a first PED carried onboard a vehicle, wherein the request identifies a mobile network operator (MNO) associated with the first PED. The interconnection point can operate to authenticate 1702 the first PED using extensible authentication protocol (EAP) communications with the PED and an AAA server associated with a partner MNO connected with the MNO identified by the first PED. The interconnection point can operate 1704 to respond to the AAA server granting access to the first PED, by setting up the PDU session for the first PED and perform network resource usage measurements for traffic in the PDU session for the first PED.

As explained above, the interconnection point can be configured to communicate with an aircraft cabin communication system, a ship cabin communication system, and/or a train cabin communication system to receive the request and to setup the PDU session for the first PED.

The interconnection point may be further configured to report the network resource usage measurements to the partner MNO connected with the MNO identified by the first PED.

As explained above, the operator associated with the airline may provide some limited services for PED voice calls and Short Message Service (SMS) via a satellite communications, based on passenger's premium seat and/or passenger's airline membership status, etc. Thus, prior to receipt of the request, the interconnection point can be configured to respond to receipt of an earlier request to send a text message for the first PED or to setup a voice call for the first PED, by sending the text message or setting up the voice call without sending a query to the first PED which requests the passenger operating the first PED to authorize making charges for the text message or the voice call to the operator associated with the vehicle or to the MNO identified by the first PED.

The interconnection point can be configured to respond 1800 to receipt of the request to setup the PDU session through the Internet for the first PED, by sending a first query to the first PED requesting a passenger operating the first PED to authorize making charges for the PDU session to an operator associated with the vehicle or to the MNO identified by the first PED. The interconnection point can respond 1802 to a reply from the first PED authorizing making charges for the PDU session to the MNO identified by the first PED, by initiating the authentication of the first PED using the EAP communications with the partner MNO connected with the MNO identified by the first PED.

Based on receiving the grant from the AAA server, the interconnection point may perform charging to the partner MNO connected with the MNO identified by the first PED based on the network resource usage measurements for traffic in the PDU session for the first PED.

FIG. 19 illustrates operations that may be performed by interconnection point when a passenger has authorized charging for PED Internet access to an operator associated with airline.

Referring to FIG. 19, the interconnection point can receive 1900 from the vehicle cabin communication system, another request to setup a PDU session through the Internet for a second PED carried onboard the vehicle, wherein the other request identifies another MNO associated with the second PED. The interconnection point can respond 1902 to receipt of the other request to setup the PDU session through the Internet for the second PED, by sending a second query to the second PED requesting a passenger operating the second PED to authorize making charges for the PDU session to an operator associated with the vehicle or to the partner MNO connected with the other MNO identified by the second PED. The interconnection point can operate 1904, based on a reply from the second PED authorizing making charges for the PDU session to the operator associated with the vehicle, by setting up the PDU session for the second PED through the operator associated with the vehicle and performing network resource usage measurements for traffic in the PDU session for the second PED.

The interconnection point may perform charging to the operator associated with the vehicle based on the network resource usage measurements for traffic in the PDU session for the second PED.

In some other embodiments, the aircraft-based communication system and/or the ground-based communication system may respond to a PED request to set up a PDU session through the Internet by determining whether the partner MNO is connected with the MNO identified by the PED (e.g., partner MNO can operate as a charging clearinghouse for the PED identified MNO) and, if so, the PED may be authenticated and the PDU session setup without querying the passenger as to whom should be charged (e.g., without sending a query through the WAP to the PED requesting a passenger operating the PED to authorize making charges for the PDU session to an operator associated with the vehicle or to the MNO identified by the first PED).

27. PED, Vehicle Cabin Communication System Components, and Ground-Based Communication System Components The PED, vehicle cabin communications system (WAP/connectivity server), and/or ground-based communication system (interconnection point) may each include one or more transceivers (referred to as "transceiver" for brevity), one or more processors (referred to as "processor" for brevity), and one or more memories (referred to as "memory" for brevity) containing program code. The transceiver may be configured to communicate according to one or more proprietary and/or industry standardized wireless communication protocols, e.g., WiFi, 3GPP 4G, 5G (NR), SATCOM, etc. The processor may include one or more data processing circuits, such as a general purpose and/or special purpose processor (e.g., microprocessor and/or digital signal processor) that may be collocated or distributed across one or more networks. The processor is configured to execute program code in the memory, described below as a computer readable medium, to perform some or all of the operations and methods that are described above for a UE in accordance with one or more of the embodiments disclosed herein.

Glossary

AAA—Authentication, authorization, and accounting, a system in IP-based networking that controls the computer resources to which Customers of the Parties have access, and that keeps track of the activity of Roaming Customers on the Parties' respective networks.

Access Point—A WLAN transceiver that connects a wired Local Area Network (LAN) to one or many wireless Devices.

Authentication—means the process of identifying a roaming customer, usually based on a Sim card and granting access to such roaming customer on their carrier's network.

DCH/FCH—Data Clearing House and Financial Clearing house in charge of settlement, billing and invoicing the traffic generated by MNO users onto Wi-Fi networks partners, for Orange IC EoGRE Tunnelling—Ethernet over GRE (EoGRE) is a new aggregation solution for aggregating Wi-Fi traffic from hotspots. This solution enables customer premises equipment (CPE) devices to bridge the Ethernet traffic coming from an end host, and encapsulate the traffic in Ethernet packets over an IP GRE tunnel. When the IP GRE tunnels are terminated on a service provider broadband network gateway, the end host's traffic is terminated and subscriber sessions are initiated for the end host.

GSMA PRD—A document listed on the GSM Association list of Permanent Reference Documents (as amended from time to time).

HPMN (Home Public Mobile Network) Operator or HPMN—A Connected Operator who provides mobile telecommunications services for its roaming customers in a geographic area where it holds a license or has a right to establish and operate a Public Mobile Network.

International Roaming or IR Services—The services relating to the International Roaming provided by a Connected Operator, accessible via Orange Wi-Fi Roaming Hub in order that Roaming Customers may use of Visited Wi-Fi Network.

IPX Connectivity—The transport, which may be provided over Deutsche Telekom AG™ IPX Network, of Wi-Fi data and signalling traffic generated by Orange's Clients end users interconnected to Orange Wi-Fi Roaming Hub.

Orange Wi-Fi Roaming Hub—The technical infrastructure, hardware and software platform, using an IPX connectivity which may be provided by Deutsche Telekom AG™ for the provision of Orange Wi-Fi Roaming Service to Connected Operators and Wi-Fi network operators Passpoint (also known as Hotspot 2.0)—a technology that allows mobile devices to automatically connect to available Passpoint-certified Wi-Fi hotspots. This technology gives the device liberty to hop from one hotspot on a network to another without the need log in to each hotspot.

Public Mobile Network or PMN or MNO—means a network that complies with the definition of a GSM network as set out in Article 5 of the Articles of Association of the GSMA.

RADIUS—an acronym for Remote Authentication Dial-In User Service, and is a system used by many Internet service providers and Roaming Customers organizations to provide secure Internet access.

Roaming Customer—means a person or entity with a legal relationship with a Connected Operator (acting as a HPMN) using a GSM SIM (Subscriber Identity Module) and/or a GSM USIM (Universal Subscriber Identity Module) for access and use of the Visited Wi-Fi Network.

TWAG—Trusted Wireless Access Gateway connect the packet core and the trusted WIFI network. TWAG will be able to convert the Wi-Fi data traffic reports in TAP format (TAP is used by MNOs).

TWAN—Trusted Wireless Access Network including TWAG (Trusted Wireless Access Gateway) and TWAP (Trusted Wireless Access Point) dedicated to users data traffic TWAP—Trusted Wireless Access Point. A wireless access point (WAP) is a hardware device or configured node on a local area network (LAN) that allows wireless capable devices and wired networks to connect through a wireless standard.

UDR—User Detail Record (traffic).

Visited Wi-Fi Network means a Wi-Fi Supplier who provides internet telecommunications services for Roaming Customers, in a geographic area where it holds a license or has a right to establish and operate a Wi-Fi Network.

WISP means Wireless Internet Service Provider

WLAN—means a Wireless Local Area Network (or Wireless LAN) in which data is transmitted from point to point without the use of wires. WLANs are also known as Wi-Fi networks and for this Agreement will specifically mean wireless networks that adhere to the standards.

Abbreviations

Term Definition

AAA Authorization, Authentication, and Accounting
ABS Airport Base Server
ACA Air Canada
ACC Aircraft Connectivity Controller
ADIRU Air Data Inertial Reference Unit
ADLP Aircraft Data Link Provider
AOC Airline Operations Center
AOR Atlantic Ocean Region
API Application Programming Interface
APM Aircraft Personality Module
AS Autonomous System
ASI Antenna System Interface
ASN Autonomous System Number
ASU Airborne Server Unit
BI Business Intelligence
CBWQ Class-Based Weighted Queueing
CC IAP Communication Content Intercept Access Point
CMS Content Management System
CoS Class of Service
COTS Commercial Off The Shelf
CS Content Server
CWAP Cabin Wireless Access Point
DCH Data Clearing House
DHCP Dynamic Host Control Protocol
DNS Domain Name Service
DPI Deep Packet Inspection
DSCP Differentiated Service Code Points
DSU Digital Server Unit
EA Enterprise Architecture
EAPoL Extensible Authentication Protocol over LAN
eBGP External Border Gateway Protocol
EoF End of Flight
EU European Union
FCH Financial Clearing House
FPM Fleet Performance Metric
GCMNO Global Carrier Mobile Network Operator
GCMS Global Connectivity Management System
GCP Global Connectivity Platform
GFTP Ground Functional Test Procedure
IFEC In-Flight Entertainment and Connectivity
I/F Interface
IOR Indian Ocean Region
IP Interconnect Point IRI IAP Intercept-Related Information Intercept Access Point
ISP Internet Service Provider
JMS Java Message Service
KANDU Ku/Ka Aircraft Networking Data Unit
KRFU Ku/Ka-band Radio Frequency Unit
LAIC Legacy Aircraft Interface Controller
LAN Local Area Network
LEA Law Enforcement Agency
LRU Line Replaceable Unit
MAC Media Access Control
MAP Multi-Purpose Server (MPS) Application Platform
MAS-A Modular Antenna System-Ka Band
MDA Modular Dorsal Antenna
MIBs Management Information Bases
MMP Meet-Me Point
MNG Mobile Network Gateway
MODMAN Modem and Manager
MPLS Multiprotocol Label Switching
MPS Multi-Purpose Server
MSR Magnetic Stripe Reader (Card Swipe)—a device that reads and transmits data from a credit card's magnetic stripe.
MVP Minimum Viable Product
MXC Maintenance Console
NAP Network Aggregation Point
NAT Network Address Translation
NFS Network File System
NIC Network Interface Card
NSH Network Services Header
MOC Maintenance Operations Center
NDS Network Demographics System
NOC Network Operations Center—proprietary system that provides an interface to display issues with the network that supports the InFlyt systems
NPCP Network Policy Control Platform
OAE Out of Aircraft Equipment
OMS Order Management Service—A service internal to GCMS that processes and manages internet service requests.
OTA Over the Air
PCI Payment Card Industry
PCT Portal Customization Tool
PDA Project Design Authority
P2P Peer-to-Peer
PED Personal Electronic Device—an electronic device (e.g., smartphone, tablet, laptop) used by a Passenger to connect to the in-cabin network.
PKI Public Key Infrastructure
PoP Point-of-Presence
POR Pacific Ocean Region
PoS Priority of Service
PSD Payment Storage Device
PRTG COTS product for network monitoring
QoE Quality of Experience
QoS Quality of Service
RADIUS Remote Authentication Dial In User Service
RAID Redundant Array of Independent Disks
RAM Random Access Memory
RMS Remote Monitoring Service—A service internal to GCMS that monitors system health, events, and anomalies.
RPC Retail Product Catalog RPI Retail Product Item—Any media, movie, or service available to a flight passenger that can be acquired through purchase or available for free during the flight.
RPR Retail Product Rule
RPS Retail Payment Service—A service internal to GCMS and LKMS that processes and manages payment processing.
RTT Round Trip Time
SATCOM Satellite Communications
SCR Smart Card Reader
SD Standard Definition
SDU Seat-Back Display Unit—a tablet-sized display/interface mounted to a seat-back (or similar fixture) within an airplane. Same as SVDU.
SLA Service Level Agreement
SNMP Simple Network Management Protocol
SOE Sequence of Execution
SSH Secure Shell
SSL Secure Socket Layer
SSID Service Set Identifiers
STV+ Streaming TV
SSPC Subscription Services Profile Component
SVDU Smart Video Display Unit—a tablet-sized display/interface mounted to a seat-back (or similar fixture) within an airplane. Same as SDU.
TCP Transmission Control Protocol
TIP Thales Interconnect Point
TIS Travel Information Service TMM Thales Modular Modem
ToS Type of Service
TSP Thales Software Package
TSU TV Streaming Unit
TVS Thales Value-Added Service
UDP User Datagram Protocol
UE User Equipment
UMS User Managed Services—a collection of services that together shape an internet user's session experience during flight.
UPS Unified Payment Solution
URI Uniform Resource Identifier
URL Universal Resource Locator
USR User Session Record
VoIP Voice over Internet Protocol
WADL Wireless Aircraft Data Link
WAP Wireless Access Point
WRR Weighted Round Robin In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A vehicle cabin communication system comprising:
a wireless access point (WAP) configured to:
  transmit a beacon indicating Hotspot capability and identifying an open service set identifier (SSID),
  establish a connection with a first passenger electronic device (PED) carried onboard a vehicle responsive to communications received from the first PED using the open SSID, and
  provide a list of mobile network operators (MNOs) to the first PED; and
a connectivity server configured to:
  receive a request to setup a protocol data unit (PDU) session through the Internet for the first PED, wherein the request identifies a mobile network operator (MNO) associated with the first PED and identifies an international mobile subscriber identity (IMSI) of the first PED,
  respond to the request to setup the PDU session for the first PED, by initiating authentication of the first PED using extensible authentication protocol (EAP) communications with the first PED and an authorization, authentication, and accounting (AAA) server associated with a partner MNO connected with the MNO identified by the first PED, and
  responsive to the AAA server granting access to the first PED, trigger the WAP to redirect communications with the first WAP to a hidden SSID, setup the PDU session for the first PED using the hidden SSID, and perform network resource usage measurements for traffic in the PDU session for the first PED.

2. The vehicle cabin communication system of claim 1, wherein the vehicle cabin communication system comprises an aircraft cabin communication system, a ship cabin communication system, and/or a train cabin communication system.

3. The vehicle cabin communication system of claim 1, wherein the connectivity server is further configured to report the network resource usage measurements to the partner MNO connected with the MNO identified by the first PED.

4. The vehicle cabin communication system of claim 1, wherein the list of MNOs comprises a list of roaming consortium organization identifiers (OIs).

5. The vehicle cabin communication system of claim 1, wherein the WAP transmits an indication of Hotspot 2.0 capability.

6. The vehicle cabin communication system of claim 1, wherein:
the WAP is further configured to:
  establish a connection with a second PED carried onboard the vehicle responsive to communications received from the second PED using the open SSID, and
  provide the list of MNOs to the second PED; and
the connectivity server is further configured to:
  receive another request to setup a PDU session through the Internet for a second PED, wherein the request identifies a MNO associated with the second PED and identifies an IMSI of the second PED,
  respond to receipt of the request to setup the PDU session for the second PED, by sending a second query through the WAP to the second PED requesting a passenger operating the second PED to authorize making charges for the PDU session to the operator associated with the vehicle or to the MNO identified by the second PED, and
  based on a reply from the second PED authorizing making charges for the PDU session to the operator associated with the vehicle, setup the PDU session for the second PED through the operator associated with the vehicle and perform network resource usage measurements for traffic in the PDU session for the second PED.

7. The vehicle cabin communication system of claim 6, wherein the connectivity server is further configured to:
  perform charging to the operator associated with the vehicle based on the network resource usage measurements for traffic in the PDU session for the second PED.

8. The vehicle cabin communication system of claim 7, wherein the connectivity server is further configured to:
  respond to receipt of the request to setup the PDU session for the first PED, by sending a first query through the WAP to the first PED requesting a passenger operating the first PED to authorize making charges for the PDU session to an operator associated with the vehicle or to the MNO identified by the first PED; and
  respond to a reply from the first PED authorizing making charges for the PDU session to the MNO identified by the first PED, by initiating the authentication of the first PED using the EAP communications with the partner MNO connected with the MNO identified by the first PED.

9. The vehicle cabin communication system of claim 8, wherein the connectivity server is further configured to:
   based on receiving the grant from the AAA server, perform charging to the partner MNO connected with the MNO identified by the first PED based on the network resource usage measurements for traffic in the PDU session for the first PED.

10. The vehicle cabin communication system of claim 8, wherein the connectivity server is further configured to:
    prior to receipt of the request, respond to receipt of an earlier request to send a text message for the first PED or to setup a voice call for the first PED, by sending the text message or setting up the voice call without sending a query through the WAP to the first PED which requests the passenger operating the first PED to authorize making charges for the text message or the voice call to the operator associated with the vehicle or to the MNO identified by the first PED.

11. A ground-based communication system to support communications of passenger electronic devices (PEDs) onboard passenger vehicles, the ground-based system comprising:
    an interconnection point configured to:
       receive from a vehicle cabin communication system, a request to setup a protocol data unit (PDU) session through the Internet for a first PED carried onboard a vehicle, wherein the request identifies a mobile network operator (MNO) associated with the first PED;
       authenticate the first PED using extensible authentication protocol (EAP) communications with the PED and an authorization, authentication, and accounting (AAA) server associated with a partner MNO connected with the MNO identified by the first PED; and
       responsive to the AAA server granting access to the first PED, setup the PDU session for the first PED and perform network resource usage measurements for traffic in the PDU session for the first PED.

12. The ground-based communication system of claim 11, wherein the interconnection point is configured to communicate with an aircraft cabin communication system, a ship cabin communication system, and/or a train cabin communication system to receive the request and to setup the PDU session for the first PED.

13. The ground-based communication system of claim 11, wherein the interconnection point is further configured to report the network resource usage measurements to the partner MNO connected with the MNO identified by the first PED.

14. The ground-based communication system of claim 11, wherein the interconnection point is further configured to:
    respond to receipt of the request to setup the PDU session through the Internet for the first PED, by sending a first query to the first PED requesting a passenger operating the first PED to authorize making charges for the PDU session to an operator associated with the vehicle or to the MNO identified by the first PED; and
    respond to a reply from the first PED authorizing making charges for the PDU session to the MNO identified by the first PED, by initiating the authentication of the first PED using the EAP communications with the partner MNO connected with the MNO identified by the first PED.

15. The ground-based communication system of claim 14, wherein the interconnection point is further configured to:
    based on receiving the grant from the AAA server, perform charging to the partner MNO connected with the MNO identified by the first PED based on the network resource usage measurements for traffic in the PDU session for the first PED.

16. The ground-based communication system of claim 14, wherein the interconnection point is further configured to:
    respond to receipt of an earlier request to send a text message for the first PED or to setup a voice call for the first PED, by sending the text message or setting up the voice call without sending a query to the first PED which requests the passenger operating the first PED to authorize making charges for the text message or the voice call to the operator associated with the vehicle or to the MNO identified by the first PED.

17. The ground-based communication system of claim 11, wherein the interconnection point is further configured to:
    receive from the vehicle cabin communication system, another request to setup a PDU session through the Internet for a second PED carried onboard the vehicle, wherein the other request identifies another MNO associated with the second PED;
    respond to receipt of the other request to setup the PDU session through the Internet for the second PED, by sending a second query to the second PED requesting a passenger operating the second PED to authorize making charges for the PDU session to an operator associated with the vehicle or to the partner MNO connected with the other MNO identified by the second PED; and
    based on a reply from the second PED authorizing making charges for the PDU session to the operator associated with the vehicle, setup the PDU session for the second PED through the operator associated with the vehicle and perform network resource usage measurements for traffic in the PDU session for the second PED.

18. The ground-based communication system of claim 17, wherein the interconnection point is further configured to:
    perform charging to the operator associated with the vehicle based on the network resource usage measurements for traffic in the PDU session for the second PED.

19. A communications system to support communications of passenger electronic devices (PEDs) onboard passenger vehicles, the communications system comprising:
    a vehicle cabin communication system comprising:
       a wireless access point (WAP) configured to:
          transmit a beacon indicating Hotspot capability and identifying an open service set identifier (SSID),
          establish a connection with a first passenger electronic device (PED) carried onboard a vehicle responsive to communications received from the first PED using the open SSID, and
          provide a list of mobile network operators (MNOs) to the first PED; and
       a connectivity server configured to:
          receive a request to setup a protocol data unit (PDU) session through the Internet for the first PED, wherein the request identifies a mobile network operator (MNO) associated with the first PED and identifies an international mobile subscriber identity (IMSI) of the first PED,
          respond to the request to setup the PDU session for the first PED, by initiating authentication of the first PED using extensible authentication protocol (EAP) communications with the first PED and through an interconnection point with an authorization, authentication, and accounting (AAA) server associated with a partner MNO connected with the MNO identified by the first PED, and responsive to the AAA server granting access to the first PED, trigger the WAP to redirect communications with the first WAP to a hidden SSID, setup the PDU session for the first PED using the hidden SSID, and perform network resource usage measurements for traffic in the PDU session for the first PED; and a ground-based communication system comprising:

the interconnection point configured to:

receive from the connectivity server, a message related to the request to setup the PDU session and which identifies a mobile network operator (MNO) associated with the first PED, authenticate the first PED using the AAA server associated with a partner MNO connected with the MNO identified by the first PED, and responsive to the AAA server granting access to the first PED, communicate with the connectivity server to setup the PDU session for the first PED.

20. The communication system of claim 19, wherein the connectivity server is further configured to:

respond to receipt of the request to setup the PDU session for the first PED, by sending a first query through the WAP to the first PED requesting a passenger operating the first PED to authorize making charges for the PDU session to an operator associated with the vehicle or to the MNO identified by the first PED; and respond to a reply from the first PED authorizing making charges for the PDU session to the MNO identified by the first PED, by initiating the authentication of the first PED using the EAP communications through the interconnection point with the partner MNO connected with the MNO identified by the first PED.

* * * * *